US010902263B1

(12) United States Patent
Angel et al.

(10) Patent No.: US 10,902,263 B1
(45) Date of Patent: Jan. 26, 2021

(54) IMAGE PROCESSING SYSTEM FOR OBJECT IDENTIFICATION

(71) Applicant: Amazon Technologies, Inc., Seattle, WA (US)

(72) Inventors: Justin-Joseph Angel, San Francisco, CA (US); Robert Steven Murdock, Fairfax, CA (US); Milena Sadée, San Francisco, CA (US); Kyle Crouse, Oakland, CA (US); Eric Alan Breitbard, Oakland, CA (US); Dan Jeffrey Wilday, Seattle, WA (US); Sche I. Wang, San Francisco, CA (US); Sophia Chonghyun An, Gilroy, CA (US); Sarah Glazer, San Francisco, CA (US); Dennis Harrington, Seattle, WA (US); Paul Leland Mandel, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 232 days.

(21) Appl. No.: 16/018,589

(22) Filed: Jun. 26, 2018

(51) Int. Cl.
*G06K 9/00* (2006.01)
*G01C 21/20* (2006.01)
*G06F 16/50* (2019.01)

(52) U.S. Cl.
CPC ......... *G06K 9/00671* (2013.01); *G01C 21/20* (2013.01); *G06K 9/00805* (2013.01); *G06K 9/00825* (2013.01); *G06F 16/50* (2019.01)

(58) Field of Classification Search
None
See application file for complete search history.

(56) References Cited

U.S. PATENT DOCUMENTS

| 2015/0339951 | A1* | 11/2015 | Stevens | G06K 9/00664 348/62 |
| 2016/0373570 | A1* | 12/2016 | Scavezze | G08B 21/24 |
| 2017/0323158 | A1* | 11/2017 | Gordon | G06Q 50/20 |
| 2019/0050670 | A1* | 2/2019 | Pogorelik | G06K 7/1413 |
| 2019/0385025 | A1* | 12/2019 | McMichael | G06K 9/6272 |

* cited by examiner

*Primary Examiner* — Wei Wen Yang
(74) *Attorney, Agent, or Firm* — Quarles and Brady LLP

(57) ABSTRACT

A device includes a camera and an image processing system. A first identity of a first object represented in a first image is determined. The first image is captured at a first time. A first geographical location of the camera and a second geographical location of the first object are determined at the first time. A second identity of a second object represented in a second image is determined. The second image is captured at a second time. A third geographical location of the camera and a fourth geographical location of the second object is determined at the second time. The first object and the second object are determined to be the same when the first identity matches the second identity and the second geographical location is within a threshold distance of the fourth geographical location. The device generates an output message including information about the first object.

20 Claims, 17 Drawing Sheets

IMAGE PROCESSING SYSTEM FOR OBJECT IDENTIFICATION

BACKGROUND

There are many circumstances in which individuals may wish to know more information about objects in their environment. Individuals who are blind or who are visually impaired, for example, may not be able to see or otherwise identify objects that are at a distance. In certain environments, this could present a risk to the individual as they may not be aware of obstacles or possible collisions with moving objects. Additionally, such individuals may have trouble locating certain points of interest in particular environments, such as exits from a busy building, or shopping baskets within a store.

Camera devices, such as those found in portable smartphones or other electronic devices may be used by such individuals to capture images of the individual's environment. The images may be analyzed to generate useful data that can be communicated to the individual to assist them in navigating their environment and identifying objects within their environment.

Individuals that do not have visual impairments may similarly wish to know more about objects in their own environments. By using a camera to capture an image of an object (e.g., an article for sale in a store), the image can be used to identify the object. In turn, databases storing information describing the object (e.g., the object's price, weight, etc.) may be accessed to retrieve relevant information describing the object, which can, in turn, be provided to the individual.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
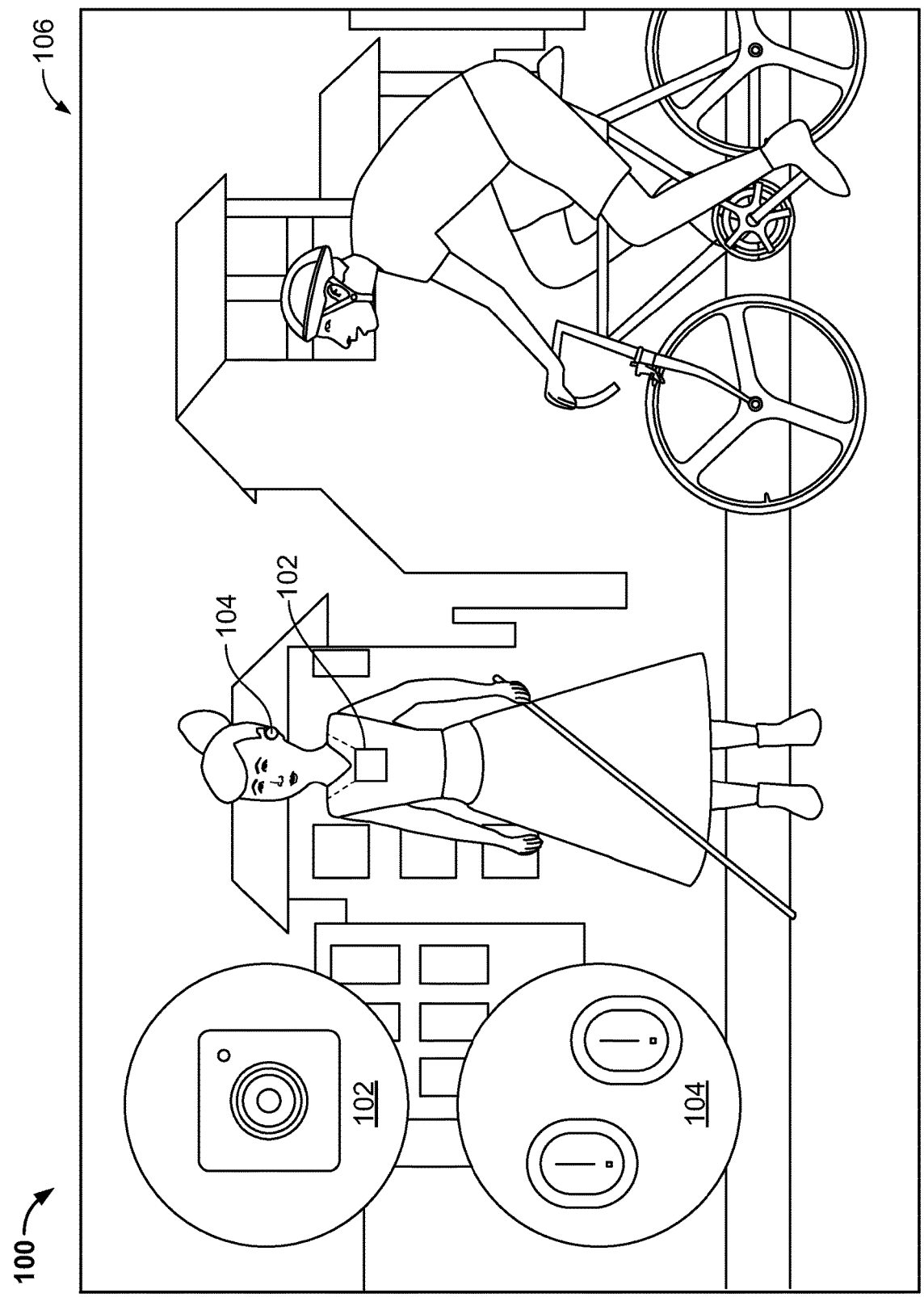
FIG. 1 is an illustration of an example environment in which the present system may be utilized to identify objects in proximity to a user.

This disclosure describes a system and techniques for providing object identifications, object locations, and related information to one or more users in a real-world environment. A user may employ a portable apparatus including a camera that captures images of the user's environment. In a typical use case, the camera may be worn on a lanyard around the neck of the user or otherwise located so that the camera is positioned to capture images of the environment in front of the user. Typically, the camera may be located over the user's chest facing forwards. Images captured by the camera are analyzed by computer vision image processing systems employing machine learning to first differentiate a number of objects that are depicted within the images captured by the camera. The image processing systems then generate an identification of the depicted objects. Additionally, a location of the objects is determined. The location may be expressed relative to the location of the camera for detecting obstacles and potential hazards as well as a real-world geographical location of the objects for navigational purposes. The collection of identified objects can be analyzed or the image itself may be analyzed to determine a scene or setting in which the user was located when the images were captured. Example scenes may be on a street, in an office building, or at a movie theatre, for example.

Based upon the current scene in which the user is located, as well as the set of objects identified within the image, the user can be provided with information about the user's environment. This may involve notifying the user of interesting objects that are in user's presence, individuals with faces recognized by the system, or objects that may present a risk of potential collision or obstacle. In this manner a user, who may be a blind or visually impaired individual, can gather information about the user's immediate environment to facilitate both interacting with that environment, as well as navigating through the environment.

The present system includes an imaging device, such as a camera, that is worn by the user. The camera is typically worn in a location enabling the camera to capture images of the user's environment. The camera captures images as the user moves through their environment. For example, the camera may capture images at a frame rate of about 5 frames per second (fps).

The camera is connected to a local image processing system configured to receive and process the captured image data. The local image processing system is implemented by a processor local to the camera and may be incorporated into the same physical device in which the camera is housed. The local image processing system analyzes the images received from the camera and implements preliminary object detection in those images. This may involve the local image processing system analyzing the images to identify the boundaries around potential objects depicted in the image and then to provide a preliminary estimate of the identity of the object. The image processing algorithms, as described herein, may utilize machine learning approaches to process the image data received from the camera.

Because the local image processing system is local to the camera and executed on a mobile device, the image processing algorithms implemented by the local image processing system may be simplified. That is, the local system may not utilize comprehensive databases or dictionaries of object identification information and may implement simplified object identification algorithms. There are two reasons for this. First, by implementing simplified object detection algorithms, the local image processing system, which may be part of the same mobile device in which the camera is located, may have reduced power consumption as compared to a device implementing comprehensive object detection schemes. Reduced power consumption may increase the battery life for the mobile device implementing both the camera and the local image processing system. Additionally, the simplified object detection algorithms enable the local image processing system to operate quickly. Although the local image processing system may not provide a very detailed analysis of objects identified in the images captured by the camera, the local image processing system can quickly identify objects and their locations relative to the camera and, thereby, the user wearing the camera. As described below, this can enable the local image processing system to quickly identify objects that are either located or moving in a manner that may lead to a collision with or obstacle to the user.

To detect potential object collisions, for, example, the local image processing can track objects that are depicted in the images or frames being captured by the system's camera. As the object depiction or representations move within the images, the local image processing system can determine how a particular object is moving with respect to the user. Although the local image processing system, which utilizes simplified object identification routines, may not accurately identify a moving object (e.g., the object could be a car or a truck, but the local image processing system may only identify the object as a "vehicle"), the local image processing system can quickly determine that a vehicle is moving in a manner that may lead to a collision with the user. Having detected the potential collision, the system can warn the wearer.

To provide information to the user (e.g., to inform the user of identifications of objects near the user or to warn the user of a potential collision), the system may communicate with the user in any suitable manner. Typically, this includes providing audible feedback to the user through headphones or another suitable audible feedback device, as described herein. The feedback can be in any form, such as synthesized speech generated by a text-to-speech agent that generates output speech. In the case or warnings or alerts (e.g., of a potential collision or proximity to an obstacle), the feedback could be in the form of an alarm (e.g., a siren or series of beeps) to alert the user to the potential collision.

Because the image data captured by the camera and subsequent object identification can be utilized to determine a location of the object with respect to the user, the information provided to the user can also describe the object's location with respect to the user. Where an object is moving over time and may potentially collide with the user, for example, the information provided to the user could warn of the potential collision and also inform the user of where the potentially colliding object is with respect to the user. In the case of a potential vehicle collision, for example, the system may inform the user of a "vehicle approaching from the right that may collide with you."

Although the local image processing system implements relatively simple object detection algorithms, the system is also configured to utilize remote computing resources to provide more robust object detection and identification. Specifically, images captured from the system's camera can be transmitted to a remote computing system. The remote computing system, which may be a cloud-based computing resource, is configured to implement more robust and detailed object detection algorithms to both more accurately and more specifically identify objects contained within the images captured by the camera. Although such algorithms require more time to execute (an example remote image processing system may only analyze images at a rate of 2 frames per second, for example), the object detection implemented by the remote image processing system may be both more accurate and more detailed than that implemented by the local system. For example, while the local image processing system may analyze an image of a street and only identify a particular object as a "vehicle", the remote image processing system, which may utilize more processing power, complex analysis algorithms, and comprehensive object description databases, may identify the object as a "Red Ford Taurus."

During operation, the local image processing system may be utilized to provide an initial analysis of the user's environment and to provide preliminary object detection for objects in that environment. Simultaneously, images captured by the system's camera are provided to the remote image processing system to provide more detailed object detection. As the remote image processing system generates more detailed object identifications, those identifications can be transmitted by to the user's device and the user can be informed of the more detailed object identifications. Accordingly, when the user moves into a new scene, the system may provide the user with an initial overview of objects in the environment provided by the local image processing system, which will, over time, be supplemented by more detailed information provided by the remote image processing system.

The remote image processing system is also configured to process image data to identify a scene or type of the environment in which the user is located. Depending upon the scene, the system can be configured to detect particular objects and notify the user of the status of those objects. For example, if the user is in a street scene (e.g., standing at a cross-walk), the system may be configured to analyze the captured images to locate representations of specific objects, such as traffic lights and cross-walk and inform the user of the status of those objects. For example, the system may be configured to cause the image processing systems to identify traffic lights in any of the images captured by the system's camera. Upon detecting a traffic light, the images processing system can determine the initial status of the traffic light (e.g., which light is illuminated) and inform the user of the current state of the traffic light. Then, while the user remains in the street scene, the system can monitor the traffic light object and notify the user if the traffic light object has changed state (i.e., a different light of the traffic light is illuminated).

Similarly, depending on the scene, the system may be configured to identify specific objects and record their specific location within a scene. For example, if the system determines that the user is in a store, the system may be configured to attempt to identify check-out counters in images captured by the system's camera. If the image processing systems (local or remote) detects a check-out counter while the user is in the store scene, the location of the check-out counter can be recorded by the system. That location data can then be used in the future. If the user is in the same store and wishes to navigate to the check-out counter, the user can ask the system to navigate to the check-out counter. The previously-determined location of the check-out counter is then retrieved and, as discussed herein, used to assist the user in navigating to the check-out counter. Navigation may be implemented by informing the user of the relative location of the check-out counter with respect to the user's current location, as determined by a location sensor within the user's device. In some cases, the location data for particular objects may be shared publicly so that other users of similar systems may rely on location data of objects captured by other users in navigating through particular spaces. In this manner, the image data captured by a number of users moving through a public space (e.g., a shopping mall) can be collected to generate a map of way points within the shopping mall.

The image data captured by the user's device may capture images of many objects in a single image or sequence of images. Rather than simply informing the user of all identified objects, which could be overwhelming, the system may prioritize certain types of objects and inform the user of objects according that priority. Highest priority objects may include those that present potential obstacles or potential collisions—the user will be notified of such object identifications first. New objects may also be prioritized. If the user has not been notified of a particular object in the past, the user may be preferentially notified of the object. But if the user has already been notified of a particular object within a particular time limit (e.g., 5 minutes), the user will not be notified of the object again until that time limit has expired. If the system is configured to implement facial recognition and an identified object is a face of a person known to the user, such object identification may also be preferentially reported to the user. Objects that are identified as faces but that are not known to the user may not be preferentially reported to the user unless certain conditions are met (e.g., a potential obstacle).

FIG. 1 is an illustration of an example environment 100 in which the present system may be utilized. The system includes an imaging device or camera 102 configured to capture images of an environment of a user of the system. In some cases, the user may be a blind or visually impaired person and camera 102 is configured to capture images of objects in the environment that may be difficult for the user to see. Camera 102 is connected to image processing systems, which may be local to camera 102 (e.g., contained within the same housing as camera 102) or at least in close proximity to camera 102 (e.g., an image processing system implemented by a mobile device or phone carried by the user and in wireless communication with camera 102) or may be remote to camera 102 (e.g., a cloud-based image processing system in wireless communication with camera 102).

Camera 102 is configured to transmit the images captured of the user's environment to the local and remote image processing systems. In some embodiments, camera 102 (or another component of the system) may be configured to capture additional information describing the user's current location (e.g., via a global positioning system (GPS) sensor), as well as the position and orientation of the camera. The location data and camera orientation information can also be transmitted to the image processing system for further analysis, as described herein.

The image processing systems are configured to analyze the received images and additional data to identify objects captured in the image and identify a scene of the environment. The scene is a general description of the type of environment in which the user is located (e.g., a street scene, a shopping mall scene, or a stadium scene).

The local image processing may be configured to quickly identify objects within the image data and make a best guess at to their identification. The local image processing runs quickly and may use a limited object-identification database and routines so as to provide an initial identification of objects in the environment. Conversely, the remote image processing system, which may be implemented by a cloud-based computing solution, implements more comprehensive and detailed object-detection algorithms so as to more accurately and more specifically identify objects in the images, but may process images more slowly than the local image processing system.

In this configuration, although the local image processing system may not be as accurate as the remote image processing, the local image processing system can quickly identify potential hazards in the user's environment. In environment 100, for example, the local image processing system may quickly identify the bicyclist 106 as an object moving towards the user. This can trigger an audible alert that can be communicated to the user through headphones 104 or another communication interface, such as bone conduction headphones. At a later time, when the remote image processing system has completed its image analysis, the user may be notified that the object is a bicyclist riding a blue bicycle across the user's path.

Camera 102 is configured to continually capture images of the user's environment and transmit those images in the form of an image data stream for image processing. By monitoring objects in the user's environment in the sequence of captured images, the image processing systems can identify objects that are newly in the user's environment (i.e., objects that haven't been detected in previous images) and alert the user to those new objects. Additionally, should the user momentarily move (e.g., by turning around) so that a particular object is no longer captured by the camera, the user will not be re-informed about a particular object when the user turns back to face the object—the image processing system will determine that the object was detected in a prior image.

In addition to notifying the user of objects in the user's environment (and warning of potential collision with those objects), the present system can assist the user in navigating their environment. As described herein, by monitoring the user's movement through different environments (i.e., different scenes), the system can identify way points that may be used for future navigation assistance.

For example, if the user is in a public store, the system may be configured to search within the captured images of the store's interior for images of cash registers. Upon detecting a cash register in an image, the system can record the location of the cash registers. With the cash register location record, the location can be used as a way point the next time the user wishes to visit the cash registers in the store. In some cases, once the cash register location has been determined, the location can be shared with other users so that they may similarly be navigated to the cash registers.

Using the system, the user can initiate a navigation activity using any suitable user interface. In an embodiment, the system includes a microphone (not shown) configured to capture audio of the user's voice. The microphone may, for example, be implemented in conjunction with headphones 104. The audio signals may include voice instructions (e.g., "navigate to <destination>"), which can be processed by the system to initiate a navigation activity to the user's desired destination. As the user moves through the user's environment, the system, via headphones 104, can provide updated information about the user's position with respect to the target destination. Navigation may involve assisting the user in walking to a geographical destination (e.g., a train station or address) or navigating to a particular object (e.g., the cash registers or a chair) or person in the user's immediate environment.

Figure 2:
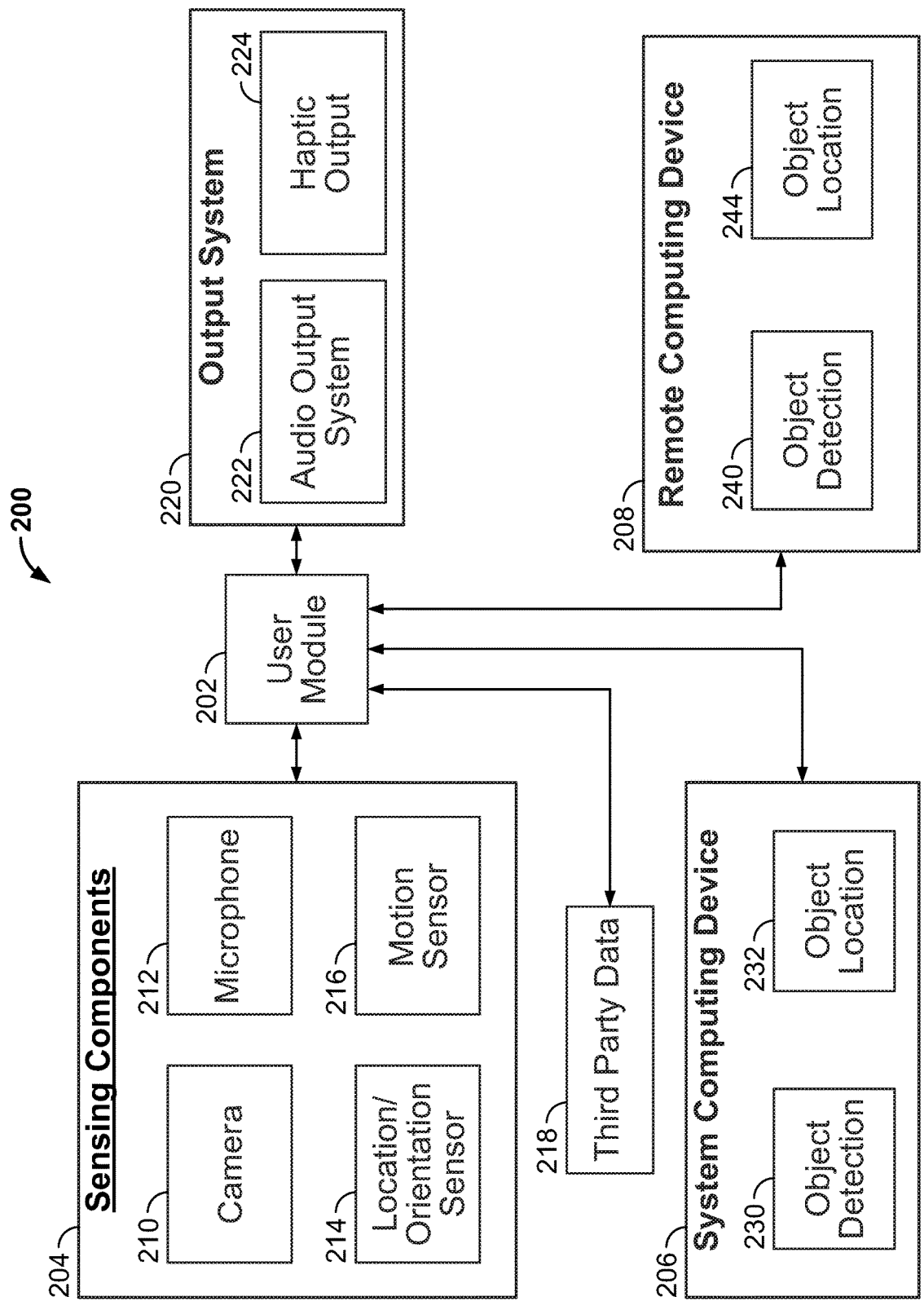
FIG. 2 is a block diagram illustrating an example framework of a system for monitoring a user's environment using captured images and providing feedback to the user based upon an analysis of those images.

FIG. 2 is a block diagram illustrating an example of a framework 200 for monitoring a user's environment using captured images and providing feedback to the user based upon an analysis of those images. Framework 200 includes user module 202 that is executable to process images captured of the user's environment and provide corresponding feedback to the user. User module 202 may receive one or more types of inputs, such as data received from sensing components 204, and object identifications from an images processing system implemented by system computing device 206 and remote computing device 208.

Sensing component 204 may generate inputs to user module 202 that may include data collected from a variety of detection and sensor devices, such as image data captured by camera 210, voice instructions captured by microphone 212, position data describing a location and orientation of sensing components 204 (and, specifically, camera 210) by location/orientation sensor 214, and movement of the user by motion sensor 216. Location/orientation sensor 214 may include a GPS sensors to measure a location of sensing components 204 and a compass configured to determine an orientation of sensing components 204. In some embodiments, location/orientation sensor 214 may also be configured to detect beacon signals that originate from beacons having known and generally fixed locations to further refine the determined location data. Motion sensor 216 is configured to detect movement (e.g., via an accelerometer) that may be used, in combination with location/orientation sensor 214 to determine the user's movements and position within a particular space.

Additionally, in some implementations, user module 202 may also receive third party data 218 containing information describing attributes of the user's environment. Thus, rather than merely receiving data from sensing components 204 describing the user's environment, third party data 218 may provide additional data describing specific attributes of particular environments. For example, the third party data 218 may include maps or layouts of particular building or spaces that include information describing the location of particular objects or waypoints within the building or space. For a particular store or shop, for example, third party data 218 may include a store layout describing the location of particular goods or points of interest (e.g., restrooms or cash registers) within the store. In the case of a restaurant, third party data 218 may include a listing of menu items and options available to the user.

User module 202 performs analysis on the received inputs from sensing components 204 as well as object identifications and related metadata from system computing device 206 and remote computing device 208 to provide one or more output signals to the user through output system 220. The output generated by user module 202 may include audio information outputted through audio output system 222. Audio output system 222 may include speakers in the form of headphones worn by the user. In some embodiments, the headphones may be implemented as bone conduction headphones configured to transmit sound by vibration directly into the user's head. The audio outputs may include voice outputs describing objects within the user's environment (e.g., "there is a chair 4 feet in front of you", or "the cash registers are 25 feet ahead"), warnings (e.g., "there is a bicycle approaching from your right", or "an object at head height is just ahead of you"), or beeps or tones to signal the user's proximity to a desired object or destination (e.g., beeps that increase in frequency as the user approaches a bus stop or check-out counter). Output system 220 may also include haptic output 224 through which user module 202 can provide feedback to the user through vibrations or other tactile stimuli.

In order to determine the output generated through output system 220, user module 202 passes the image data captured by camera 210 to image processing systems implemented by system computing device 206 and remote computing device 208. System computing device 206 is a data processing system local to user module 202. For example, user module and system computing device 206 may be located within the same housing or may be in proximity to one another. Remote computing device 208 is remote to user module 202 and may be a cloud-based computing system, for example. Cloud-based computing generally refers to a network-accessible platform implemented as a computing infrastructure of processors, storage, software, data access, and so forth that is maintained and accessible via a network such as the Internet. Cloud services do not require end-user knowledge of the physical location and configuration of the system that delivers the services. Common expressions associated with cloud services include "on-demand computing", "software as a service (SaaS)", "platform computing", "network accessible platform", and so forth. While user module 202 may be directly connected to system computing device 206, user module 202 typically communicates with remote computing device 208 through a wireless or cellular data connection.

To process received image data, system computing device 206 implements an object detection module 230. Object detection module 230 is configured to analyze the image data received from user module 202 and identify, within the image data, representations of potential objects of interest. Typically this involves object detection module 230 determining, for each identified object representation within an image, a boundary box around the identified object as well as an identification of the represented object (e.g., a bicycle, tree, or dog). Along with the identification, object detection module 230 generates a confidence score for the determined identification of the object. The confidence score is typically a numerical value (e.g., a percentage), where the greater the numerical value, the more certain the object detection module 230 is of the identification of the object. With a number of objects identified for a particular image, the object detection module 230 can also identify a scene for the image. Because certain objects are typically found in particular scenes, scene identification may be performed based upon the collection of objects identified within the image by object detection module 230. For example, objects like cars, traffic lights, and road signs are typically found in street scenes, while objects like computers, chairs, and desks are typically found in office scenes. The scene is a description of the type of environment in which the image was captured (and, therefore, a description of the environment in which the user of the system is present). Typically scene descriptions include a street, indoors, train station, and the like.

In an example embodiment, object detection module 230 implements a machine learning engine or algorithm, such as artificial neural network or other classifier, to perform object detection on images captured by camera 210. Such a machine learning engine may be trained to associate images with clusters of labels or categories. In analyzing an image, edges, contours, outlines, colors, textures, silhouettes, shapes or other characteristics of objects, or portions of objects, depicted in the images may be identified using one or more algorithms or machine-learning tools. The objects or portions of objects may be stationary or in motion, and may be identified at single, finite periods of time, or over one or more images for a duration.

In the field of computer vision, various techniques exist to detect and describe local features in an image or video. An image can be characterized as a set of "feature vectors," with identifiable points in the image such as its edges and high-contrast features being extracted to identify objects in the image. These feature vectors can be compared to models created using extracted data from "training" images to identify an object or objects in the image. Applications of such image processing techniques include (among other things) object recognition, text recognition, three-dimensional modeling, gesture recognition, video tracking, and facial recognition.

An adaptive computer system is trained to recognize an object by repeatedly providing positive and negative examples of images containing an object as input into an adaptive model until the system can consistently identify the object in an image even if the object does not appear in the exact same way as it did in the images used to train the system. An "object" can be most anything, such as a glyph (e.g., a number or a letter of an alphabet), an automobile, a cat, a tree, a person, a hand, etc. By creating different models using feature vectors extracted from examples of images containing (and not containing) different objects, a computer may computer can "recognize" an object by applying the models to the data and determining which (if any) model most closely matches the input image.

Computer vision algorithms or other machine learning algorithms may be operated on computer devices of various sizes or types, including but not limited to smartphones or other cell phones, tablets, video cameras or other computer-based machines. Such mobile devices may have limited available computer resources, e.g., network bandwidth, storage capacity or processing power, as compared to larger or more complex computer devices. Therefore, executing computer vision algorithms or other machine learning algorithms, on such devices may occupy all or much of the available resources.

To improve the efficiency of the object detection module 230 implemented by system computing device 206, therefore, object detection module 230 uses a restricted dictionary of objects (e.g., 1,000 potential objects) and only searches the received images for those 1,000 objects. To further improve the efficiency of object detection module 230 as compared to other image processing systems, object detection module 230 may be implemented using a smaller amount of initial training data, which may, in turn, return the size of the neural network implemented by the computer vision system of object detection module 230. Over time, the neural network implemented by the computer vision system may be pruned so as to reduce the size of the neural network and further increase the efficiency of object detection module 230. Although this means the analysis performed by object detection module 230 is less precise (e.g., object detection module 230 may only identify a "vehicle" within an image, while another image processing system with a larger dictionary may be able to distinguish between a "truck" and a "car"), the reduced dictionary allows objection detection module 230 to detect objects within the received images more quickly than other more comprehensive object detection schemes. With a reduced dictionary of around 1,000 items, for example, object detection module 230 implemented by a computing device of a typical mobile device may complete object detection on an image in less than a second.

Having performed object detection on a received image, object location module 232 is configured to determine a location of the identified objects with respect to the user (specifically, with respect to the camera 210 that captured the images being processed).

Typically, object location involves the object location module 232 identifying, for each object identified in a processed image, a boundary of the object and a center point of each object. That process is then repeated for the same objects depicted in other images or frames captured by camera 210 and received from user module 202. Because the position of camera 210 will change with respect to the identified object in each image, object location module 232 can exploit triangulation to determine the distance between the camera 210 and the center point of the identified objects. This process is then repeated to determine the locations of each object identified in each received frame.

With the locations of each objected determined by object location module 232 with respect to camera 210 (e.g., a particular object may be determined to be 5 feet away from camera 210 and to the camera's right while another object may be determined to be 100 feet away from camera 210 straight ahead of the camera), object location module 232 can then determine the geographical location of each object in the real-world or physical environment. This involves using the relative position of each object with respect to camera 210 as well as the actual location and orientation of camera received from location/orientation sensor 214 to determine the real-world geographical location of each object. The real-world locations of each object may be expressed, for example, by GPS coordinates.

Having determined the real-world location of each object identified in the received images, as described herein, the movement of the objects can be monitored over time (e.g., based upon the determined locations of objects appearing in a sequence of images) to identify potential collisions that may occur between the user and the identified object.

In addition to the object detection and location performed by system computing device 206, user module 202 may transmit the image data captured by camera 210 to remote computing device 208 for further image processing. In this example, remote computing device 208 is implemented as a cloud-based solution providing substantial computing resources dedicated to image processing. As in the case of system computing device 206, remote computing device 208 implements an object detection module 240 and object location module 244 configured to identify objects depicted within the received images and their locations, respectively. Objection detection module 240 is similarly configured to identify scenes of images based upon the collection of objects identified in association with each image.

Remote computing device 208 implements similar computer vision algorithms as system computing device 206 to implement its own image processing. But, in contrast to the limited object dictionary of system computer device 206, remote computing device 208 is configured to use a more expansive dictionary (e.g., up to or more than 10,000 items) for object detection. Given the larger object directory, the image processing performed by remote computing device 208 will typically generate more accurate and precise object detection results than the image processing of system computer device 206. For example, in analyzing a particular object, object detection module 230 of system computer device 206 may only identify a "flower" object within a particular image, while the expansive dictionary of remote computing device 208 may enable object detection module 240 to identify the flower to be a "rose".

Although the image processing system of remote computing device 208 may provide more accurate and precise analysis, the image processing may be slower than that of system computing device 206. For example, where the reduced dictionary used by the image processing of system computing device 206 may allow it to process an image in less than a second, the more detailed analysis of remote computing device 208 may require 2-5 seconds to complete its analysis. Furthermore, because the image data and object detection location result are transferred to and from remote computing device 208 wirelessly, there can be a delay before user module 202 receives the results of the image processing of remote computing device 208.

In this arrangement, therefore the local image processing provided by system computer device 206 is used to provide initial object detection, which can be utilized to warn a user of the system of potential collisions or obstacles. Then, when the results of the more detailed image processing of remote computing device 208 are received, a consensus process can be implemented to combine the results of both the local and remote image processing to provide even more accurate object detection and location.

In some embodiments, object detection modules 230 and 240 may be used to provide additional image processing beyond just object detection. For example, the modules may perform facial recognition to identify particular faces that may appear in the captured images. The facial recognition may be extended to also analyze the identified faces to detect emotions displayed by the faces. Additionally, the object detection modules may detect textual data depicted in the captured images. With the text captured, all or portions of the text may be read to the user through audio output system 222 using a text-to-voice interface implemented by user module 202.

Figure 3:
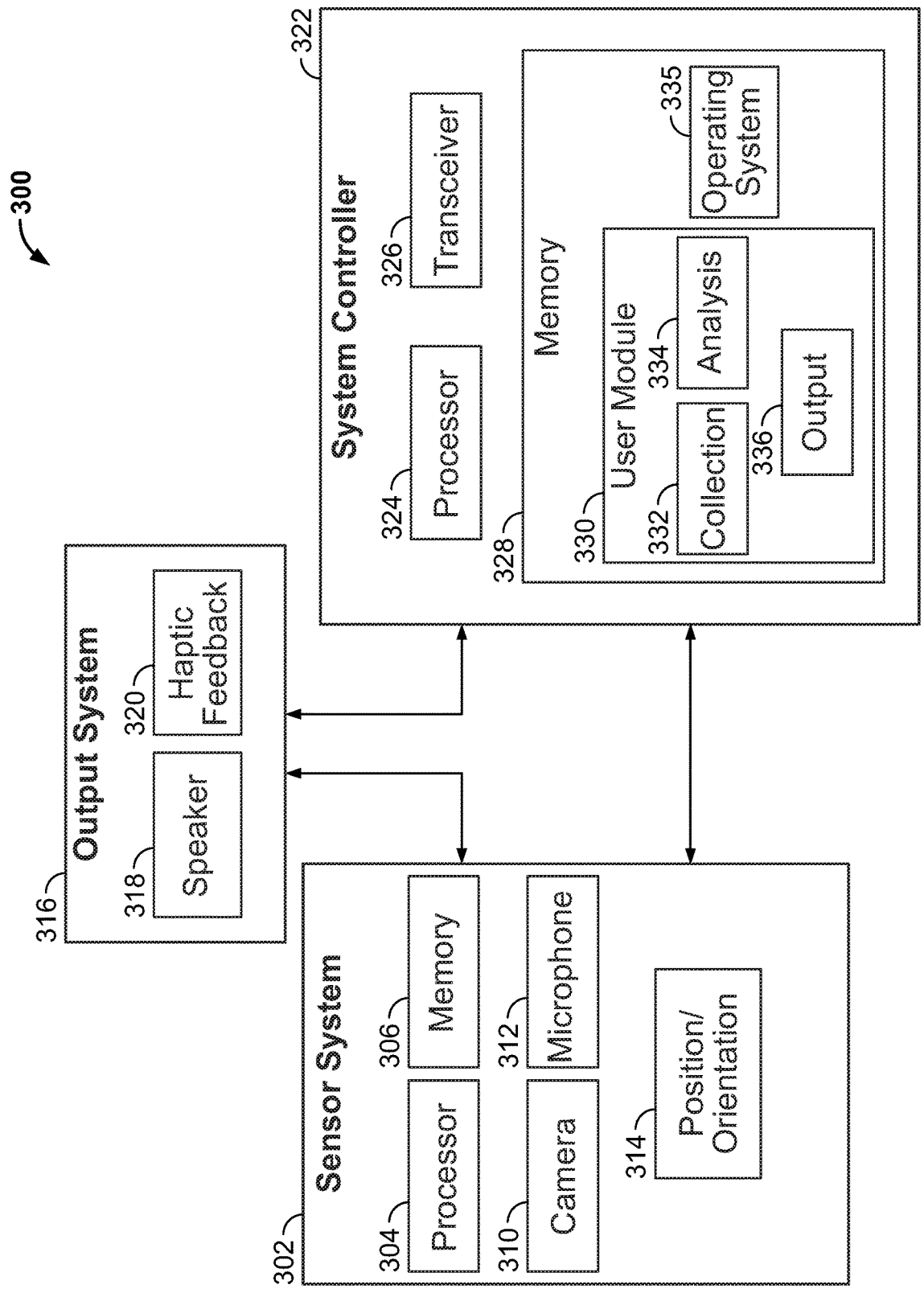
FIG. 3 is a block diagram illustrating details of a portable apparatus that may implement functionality of the system depicted in FIG. 2.

Various components of the system depicted in FIG. 2 may be implemented within or as part of a portable computing device having wireless communication capability, such as a smart phone, PDA, tablet computing device or other mobile computing device. For example, FIG. 3 is a block diagram illustrating select details of a portable apparatus or device 300 that may implement functionality of the system depicted in FIG. 2. In the illustrated example, device 300 includes sensor system 302 that includes one or more processors 304 and memory 306. For example, processors 304 may be used to control and manage the sensing components of sensor system 302, such as cameras 310, microphones 312, and position and orientation sensors 314 (e.g., a combination of GPS sensors and accelerometers). Memory 306 may be used to buffer collected camera and sensor information prior to processing by system controller 322, while also buffering information to be output through audio output system 222 or haptic feedback device 320, which may be a vibration device or other device suitable for providing tactile feedback to the user.

System controller 322 includes processor 324 configured to execute the functionality of device 300. Processor 324 may be a single processing unit or a number of processing units, all of which may include single or multiple computing units or multiple cores. For example, among other capabilities, processor 324 can be configured to fetch and execute computer-readable instructions or processor-accessible instructions stored in memory 328. Transceiver 326 is configured to enable processor 324 to communicate with remote computer systems (e.g., remote computing device 208 of FIG. 2) to transmit image data and other related metadata to those remote system and receive responsive information (e.g., object identification and locations, and scene locations) from the remote computer system.

Depending on the configuration of device 300, memory 328 is an example of computer storage media and may include volatile and nonvolatile memory. Thus, memory 328 may include, but is not limited to, RAM, ROM, EEPROM, flash memory, or other memory technology and devices, or any other medium, such as hard disk drives, which can be used to store information, applications, modules, components and data for carrying out the functions described herein. For example, memory 328 may be used to store any number of functional components and modules that are executable on system controller 322.

In the illustrated example, memory 328 may include user module 330 (e.g., user module 202 of FIG. 2), which may be executed on processor 324 to perform at least some of the functions described herein. User module 330 may include various executable components for carrying out various functions. For instance, user module 330 may include an information collection component 332 for managing the collection and storage of information from sensor system 302, as well as information obtained through transceiver 326. Additionally, user module 330 includes an analysis component 334 for analyzing the collected information, for example, by implementing an image processing system providing the functionality of object detection module 230 and object location module 232 of FIG. 2. User module 330 may further include an output component 336 for managing the output of information (e.g., audible content) via output system 316.

Typically, memory 328 also includes an operating system 335 and other modules for carrying out various other functions. For example, in implementations in which device 300 also serves as a smart phone and/or general-purpose mobile computing device, numerous other functionalities may be provided by device 300 using transceiver 326, such as the ability to make phone calls, browse the Internet, listen to music, play games, and the like. Consequently, device 300 may have additional features or functionality not illustrated herein. For example, device 300 may also include additional data storage devices (removable and/or non-removable). The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various implementations. An implementation of these modules and techniques may be stored on or transmitted across some form of computer readable media.

Figure 4:
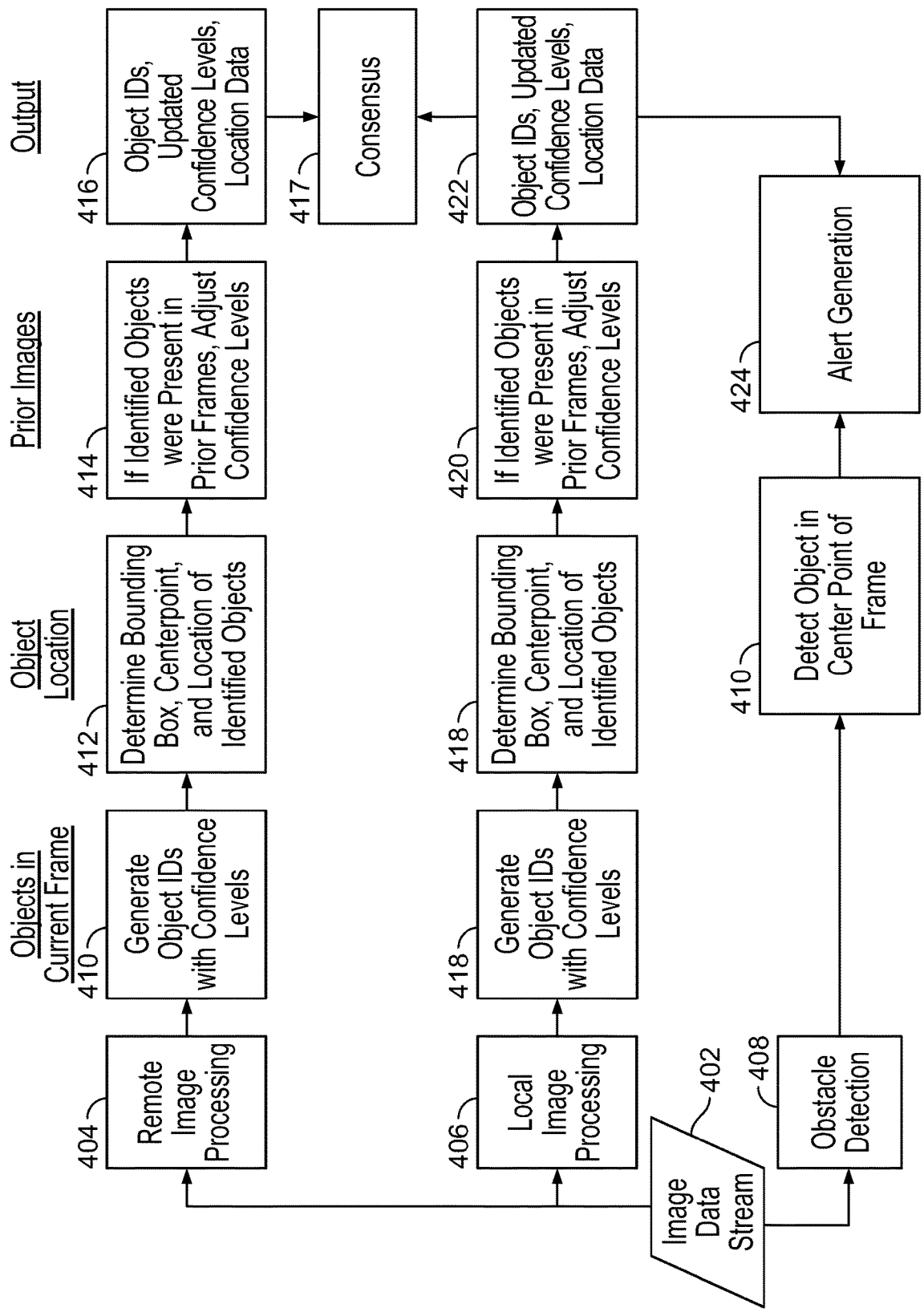
FIG. 4 is a flowchart illustrating data processing pipelines implemented by the image processing system of the present system to perform image analysis.

During operation, the present device implements a number of different data pathways or pipelines for processing the image data captured by the device's camera. FIG. 4 is a flowchart illustrating the data pipelines implemented by the image processing system of the present system. First, an image data stream 402 is generated by the device's camera (e.g., camera 210 of FIG. 2). The data stream 402 generally includes a sequence of images or frames captured by the camera in real-time as a user wearing the camera moves about a particular environment. Typically, the data stream includes images captured at a frame rate greater than 1 fps and up-to 30 fps or higher, though in other embodiments, different frame rates may be utilized. Image data stream 402 includes metadata describing attributes of the camera that captured the data stream. Specifically, the metadata may include, for each frame or image in the data stream, the location and orientation of the camera at the time the camera captured the image or frame, enabling a real-world location of objects depicted in the images captured by the camera to be determined.

Image data stream 402 is continually captured by the device's camera and, as shown in FIG. 4, provided to each of the data pipelines of the present system. Specifically, image data stream 402 is provided (e.g., via a wireless connection implemented by transceiver 326 of FIG. 3) to a first pipeline at remote image processing system 404 (e.g., implemented by remote computing device 208 of FIG. 2), a second pipeline at local image processing system 406 (e.g., implemented by system computing device 206 of FIG. 2), and a third pipeline at obstacle detection system 408 (e.g., implemented by system computing device 206 of FIG. 2).

Each pipeline processes image data stream 402 as the data stream is made available. But, as described herein, different pipelines may process image data stream 402 at different data rates. Accordingly, the data flows illustrated in FIG. 4 may be completed at different times for different data pipelines. In fact, because it is executed locally, the second pipeline through local image processing system 406 may execute multiple times before the first pipeline executed by remote image processing system 404 has completed a single iteration. Accordingly, upon receipt of an image from image data stream 402, each pipeline operates independently.

Upon receipt of a first image from image data stream 402, remote image processing system 404, in step 410 analyzes the image (e.g., utilizing object detection module 240 of FIG. 2) to identify object depictions or representations present within the image. Each object identification is associated with a confidence score, indicating a probable level of accuracy of the object identification.

Figure 5B:
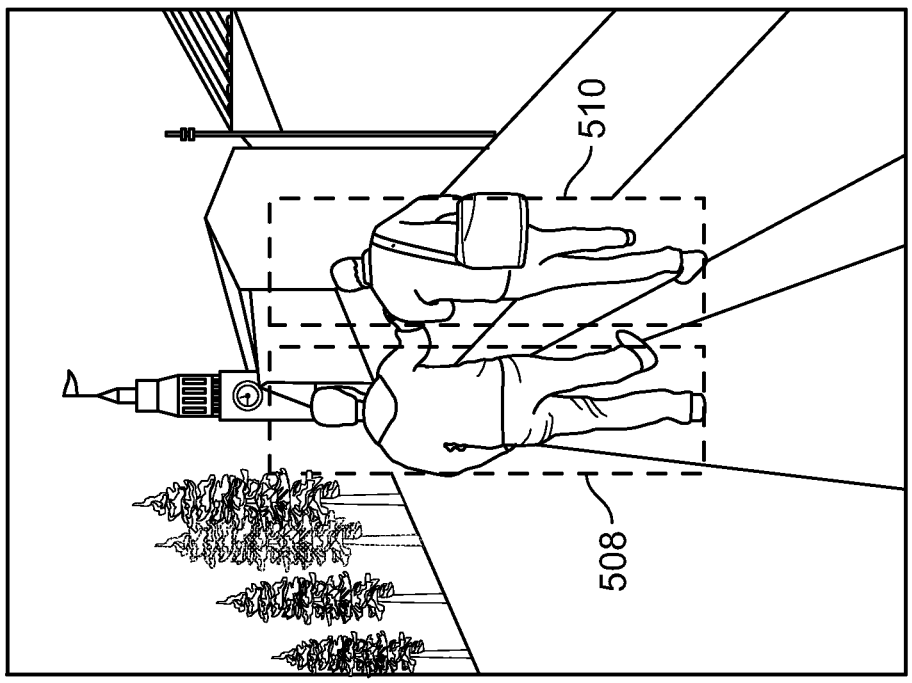
FIGS. 5A and 5B depict example images that may be processed by an image processing system according to an embodiment.
Figure 5A:
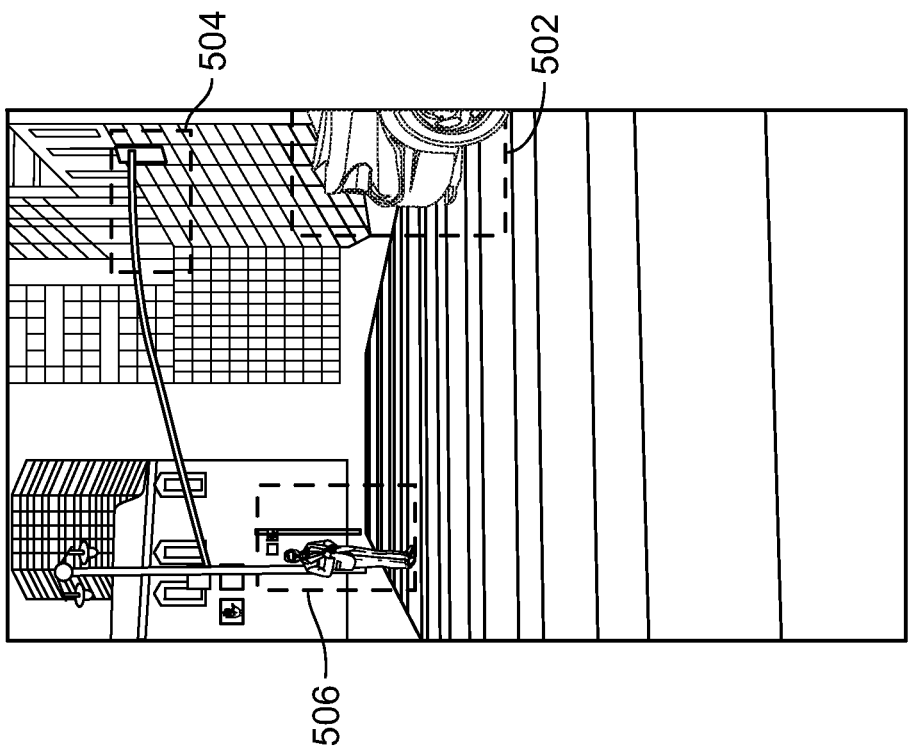

To illustrate, FIG. 5A depicts an example image that may be processed by remote image processing system 404. Following object detection, a number of different objects have been identified in association with the image. Specifically, object representation 502 is identified as a "car" object with first confidence score, object representation 504 is identified as a "traffic light" object with a second confidence score, and object representation 506 is identified as a "person" object with a third confidence score.

FIG. 5B depicts another example image that may be processed by remote image processing system 404. Following object detection, a number of different objects have been identified. Specifically, object representation 508 is identified as a "person" object with first confidence score and object representation 510 is identified as a "person" with a second confidence score.

In step 412, for each identified object, remote image processing system 404 generates a bounding box around the object, identifies a center point of the object by identifying a center of the bounding box and, as described above, identifies a location of the object. The object location may be expressed, initially, with respect to the position of the camera that captured the image in which the representation of the object appears. Accordingly, the location of the various objects could be expressed with reference to the location of the user wearing the camera (e.g., "the person is four feet in front of you, or "the traffic light is 50 feet ahead of you"). Then, using the location metadata received with image data stream 402, which specifies the location and orientation of the camera at the time the image depicting the object was captured, the relative position of the object with respect to the camera can be converted into an absolute position (i.e., a geographical location) of the object in the real world or physical environment.

Figure 5C:
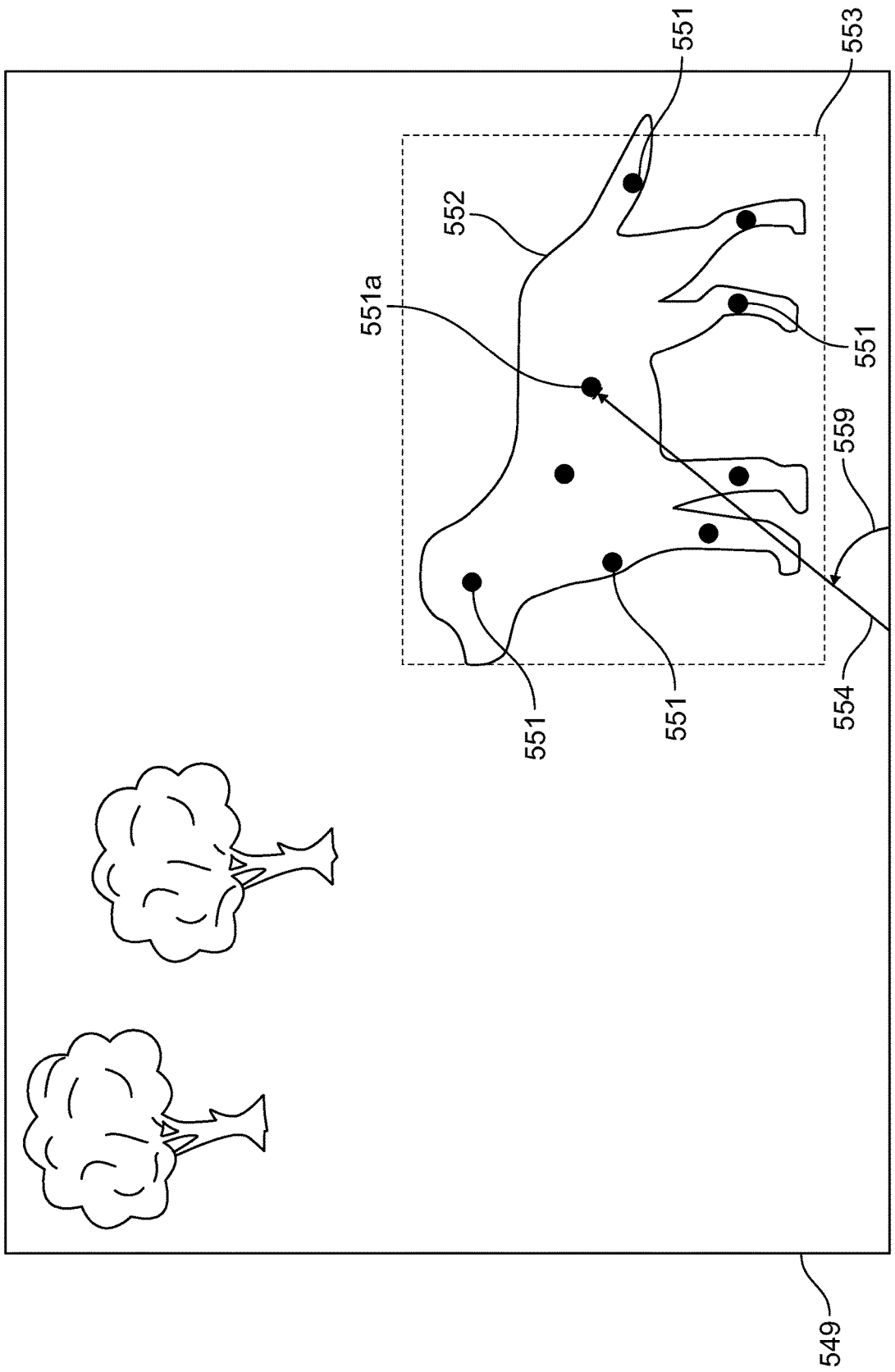
FIG. 5C shows an image depicting a scene in which an object is identified and a number of feature points on the object have been identified.

To illustrate, FIG. 5C depicts an image 549 that may be captured by the system's camera and illustrates how a position of an object in the image relative to the camera may be determined. As shown in FIG. 5C, within the image a representation of object 552 has been identified. As part of that identification, a number of object feature points 551 were identified on or about the identified object. Feature points 551 typically include edges, corners, or other points of interest that may appear in the representation of the identified object. Typically, the feature points 551 are generated by the computer vision algorithms utilized by the local and remote image processing systems to perform object detection. Additionally, the image processing system, as part of the object identification routine, establishes a bounding box 553 around the representation of the identified object 552 in image 549.

To determine the relative position of object 552 to the camera that captured the image, the image processing system first identifies the feature point 551a that is closest to the center of bounding box 553 around object 552. Having identified the feature point 551a closes to the center of bounding box 553, the image processing system calculates a relative vector 554 describing the relative position of the identified central feature point 551a to the camera that captured image 549. Relative vector 554 has an origination point at the location of the camera that captured image 549 and an end point at the location of the feature point 551a closest to the center of bounding box 553. Accordingly, relative vector 554 has a length that is equal to the distance between the camera and feature point 551a, which in turn indicates that relative vector 554 has a length equal to the distance between the camera that captured image 549 and object 552. The relative vector extends towards feature point

551a of object 552 at an angle 559, with a length equal to the distance between object 552 and the camera that captured image 549. With the relative position of object 552 so determined (and defined by relative vector 554), the geographical position of object 552 can be determined, as depicted by FIG. 5D.

Figure 5D:
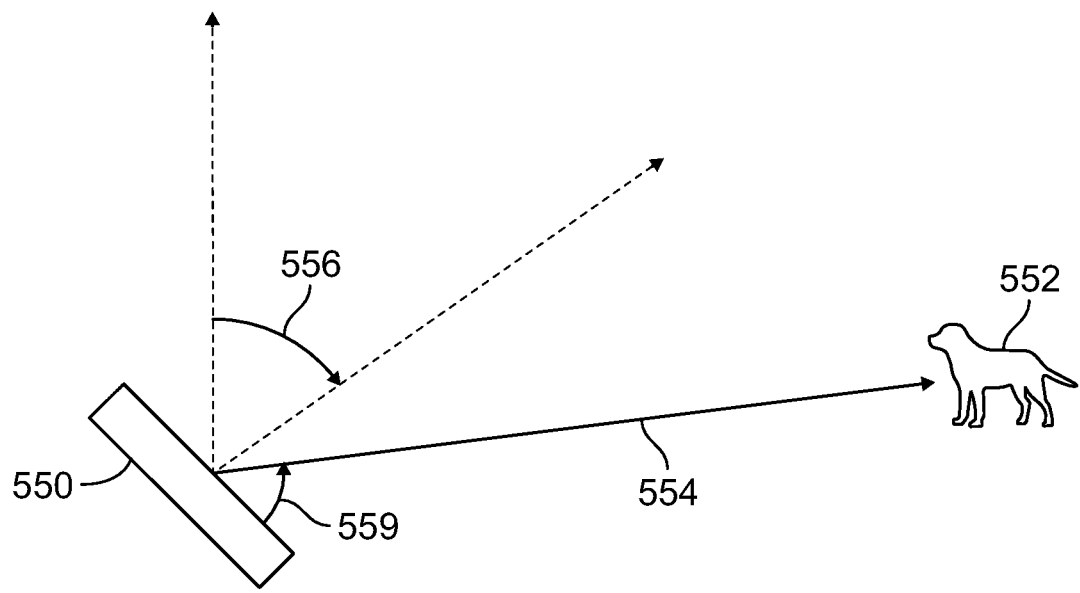
FIG. 5D is an overhead view of a scene including a camera and illustrating an example process for determining a geographic location of an identified object.

FIG. 5D is an overhead view of a scene depicting camera 550 illustrating an example process for determining a geographic location of an identified object using a relative position vector. Camera 550 has captured an image of the scene in which object 552 is depicted (i.e., image 549 of FIG. 5C). During image processing, object 552 was identified. At the time the image was captured, the geographical location of camera 550 that captured the image in which the object was identified is determined. The relative position of the object to the camera is determined through image analysis, as described above with respect to FIG. 5C, and the relative position of the object may be expressed as relative vector 554 having a length equal to the distance between the camera and the object and a direction that extends from the camera directly to the object as depicted in the image. Relative vector 554 expresses the relative position of object 552 to camera 550.

The rotational position 556 of the camera 550 (i.e., the rotational position of the camera with respect to North) is determined. The geographical location of object 552 can then be determined by the following steps. First, relative vector 554 is positioned in a real-world coordinate scheme assuming camera 550 is facing true North, with relative vector 554 originating at the location of camera 550. Then relative vector 554 is rotated by a number of degrees equal to the rotational position 556 of the camera 550. With relative vector 554 rotated, relative vector 554 is added to the position of camera 550 to translate the location of camera 550 to the location of object 552, thereby identifying the geographical location of object 552.

In some embodiments, relative vector 554 may also indicate a height or elevation of the identified object with respect to the camera that captured the image including the representation of the object. In that case, the image processing system may analyze the captured image to identify a ground plane representation with the image. A height of the identified object above that ground plane can then be determined and a relative vector can be calculated taking into account the height of the identified object above the ground plane.

After the image is processed to identify objects depicted therein and to determine a location of the identified objects, there may still be some uncertainty as to the accurate identification of those objects. A particular image may have captured a slightly distorted view of an object, for example, resulting in a potentially inaccurate identification. Similarly, images that depict objects from unusual angles may result in inaccurate identifications. As such, in step 414, remote image processing system 404 inspects previously-analyzed images of image data stream 402 to determine whether the same object identification was made in a previously-analyzed image. If the same object is identified in multiple images of image data stream 402, that may indicate an increased likelihood that the object has been accurately identified. As such, if the same object is identified in multiple images, the confidence score associated with that object identification may be increased accordingly.

But in addition to confirming that a particular object was identified in multiple images of image data stream 402, remote image processing system 404 also determines whether the same object that was identified in other images was also at a geographical location as indicated by the previous frames that is consistent with the object's geographical location as determined by analysis of the current image. By confirming that the object's geographical location is consistent through the multiple images, remote image processing system 404 can prevent false positives from artificially increasing the confidence score associated with a particular object identification.

Figure 6A:
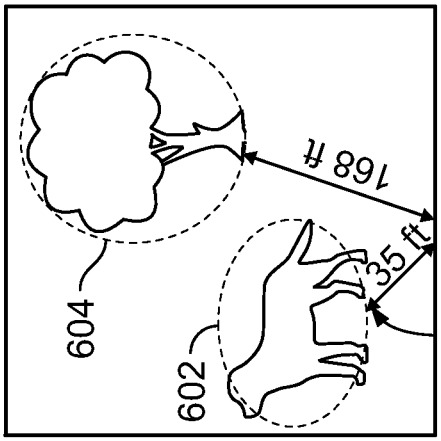
FIGS. 6A, 6B, and 6C show a first sequence of images that may be part of an example image data stream, wherein the images depict objects in proximity to a user.
Figure 6B:
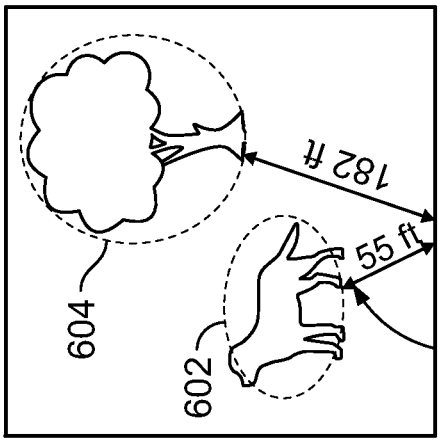
Figure 6C:
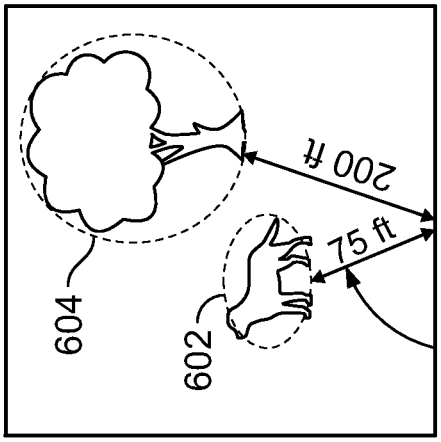

To illustrate, FIGS. 6A, 6B, and 6C show a sequence of images that may be included in an example image data stream 402. FIG. 6A represents the current image being analyzed (image N), while FIG. 6B shows a previous image that was analyzed (image N−1) and FIG. 6C shows an image that was analyzed before the image of FIG. 6B (image N−2). For the current image (FIG. 6A), the analysis steps 410 and 412 have identified a dog object 602 and a tree object 604 depicted in the image, as well as the location of the objects with respect the camera that captured the images and the geographic location of the objects in the real-world. Each object identification is associated with a confidence score and, as discussed above, remote image processing system 404 analyzes the previous images (e.g., FIGS. 6B and 6C) to determine whether the same objects have been identified in previous images.

As illustrated in both FIGS. 6B and 6C, both objects were identified in previous frames. The relative positions of the objects to the camera have changed—in this example, the user was walking towards the objects (both the representations of dog object 602 and the tree object 604 are larger in the later image of FIG. 6A than the earlier image of FIG. 6C). But, in this example, the real-world location of the dog object 602 and tree object 604 was the same (or within a margin of error) in each image, so remote image processing system 404 can determine that the same object was identified in each of the three images.

Specifically, having identified an object and the geographical location of the object in the current image, remote image processing system 404 determines whether, in the previous images of FIGS. 6B and 6C, objects having the same identification were identified and located in the same geographical location. The objects identified in multiple images may be considered to be within the same geographical location if their locations differ by less than a margin of error distance. In some embodiments, depending upon the class of object, the margin of error may be adjusted. For example, the margin of error for locations of immobile objects (e.g., trees, houses, road signs, etc.) may be relatively small (e.g., less than 2 feet or 3 feet) because their location should not change from one image to the next. But the margin of error for moveable objects (e.g., people, animals, cars, etc.) may be much larger (e.g., 25 feet or 50 feet) as the location of those objects can change from one image to the next.

Figure 7A:
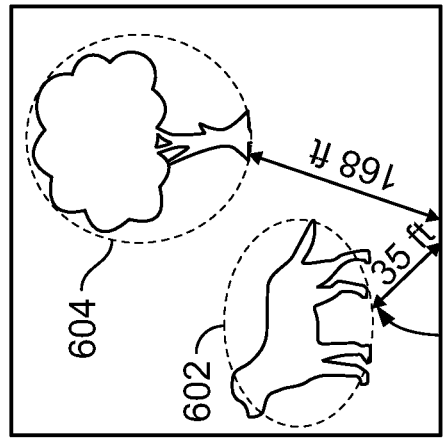
FIGS. 7A, 7B, and 7C show a second sequence of images that may be part of an example image data stream, wherein the images depict objects in proximity to a user.
Figure 7B:
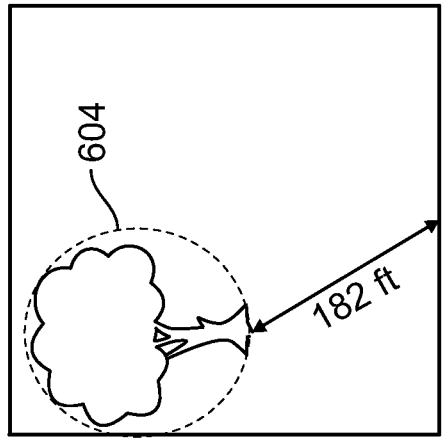
Figure 7C:
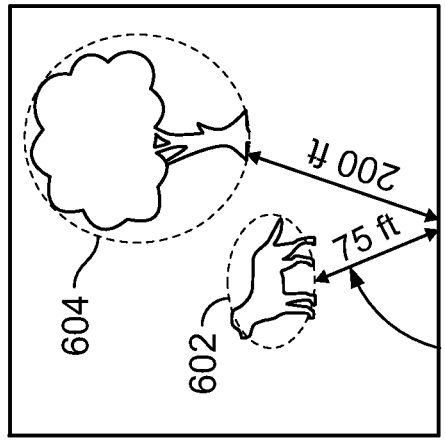

In another example, FIGS. 7A, 7B, and 7C show a sequence of images that may be included in an example image data stream 402. FIG. 7A represents the current image being analyzed (image N), while FIG. 7B shows a previous image that was analyzed (image N−1) and FIG. 7C shows an image that was analyzed before the image of FIG. 7B (image N−2). For the current image (FIG. 7A), the analysis steps 410 and 412 have identified a dog object 602 and a tree object 604 depicted in the images, as well as the location of the objects with respect the camera that captured the images and the location of the objects in the real-world. Each object identification is associated with a confidence score and, as discussed above, remote image processing system 404 analyzes the previous images (e.g., FIGS. 7B and 7C) to determine whether the same objects have been identified in previous images.

In this example, at the time the N−1 image of FIG. 7B was captured, the user had looked to the right of both objects. As such, in FIG. 7B the dog object 602 representation is no longer in the frame and it appears that the tree object 604 representation has moved. But because remote image processing system 404 was informed of the camera's orientation at the time the image of FIG. 7B was captured, the geographical location of the tree object was accurately determined as the changed orientation of the camera in FIG. 7B was compensated for. Accordingly, in this example, remote image processing system 404 can determine that tree objects 604, each in the same geographical location, were identified in each of the images of FIGS. 7A, 7B, and 7C and adjust the confidence score associated with tree object 604 accordingly. Additionally, although the dog object 602 was not identified in FIG. 7B, the dog object 602 was detected in the N−2 image of FIG. 7C and, as such, the confidence score associated with dog object 602 can be adjusted accordingly.

To modify confidence scores based upon detection of the same object in a consistent location in previous images or frame the confidence scores associated with the object identifications in each image may be combined together. For example, with reference to the tree object 604 of FIGS. 7A, 7B, and 7C. If the tree object 604 was detected in FIG. 7A with a confidence score of 32, in FIG. 7B with a confidence score of 28, and in FIG. 7C with a confidence score of 19, the adjusted confidence score associated with the tree object 604 may be equal to the sum of those confidence scores (i.e., a total of 79).

In another approach, because the object identifications in older images may become stale and less reliable over time, a multiplication factor or weight may be used to reduce the confidence scores associated with object identification in older images. For example, the weight for confidence values in the current image (N) being processed may be equal to 1, the weight for confidence values in the N−1 image being processed may be equal to 0.9, and the weight for confidence values in the N−2 image being processed may be equal to 0.8. In that case, the confidence values for each object detection may be added together taking into account the weighting (i.e., (1*32)+(0.9*28)+(0.8*19)) for a total of 47.92.

Figure 8A:
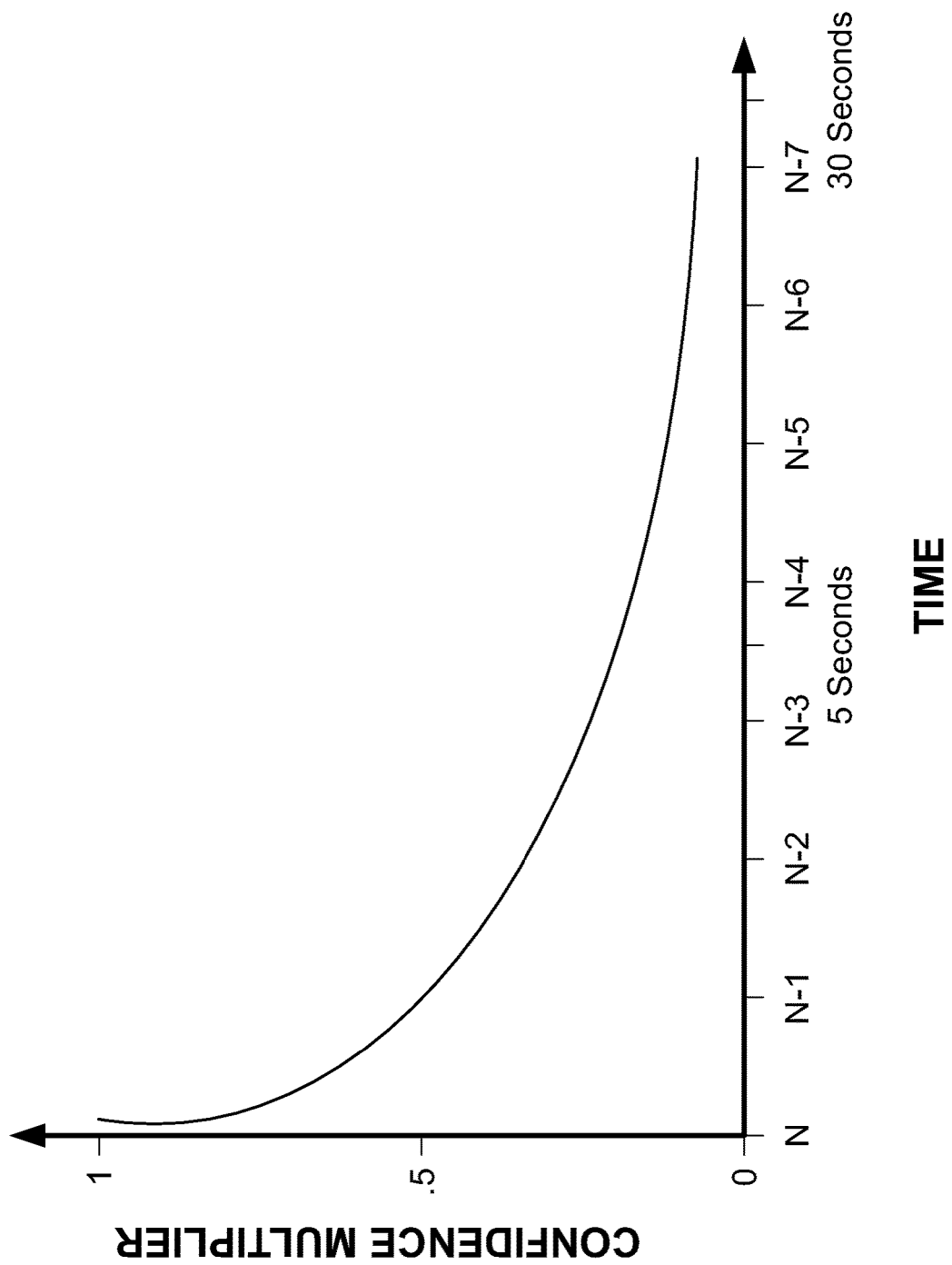
FIG. 8A is a graph depicting an example weighting curve for confidence scores associated with object identifications in older frames or images.

As a specific example, FIG. 8A is a graph depicting an example weighting curve for the confidence scores associated with object identifications in older frames or images. In the graph, the vertical axis represents the weighting to be applied, which varies from 0 to a maximum value of 1, while the horizontal axis represents the time at which an image was captured, with the left most data point representing the time at which the image being currently analyzed was captured and moving right along the horizontal axis representing increasingly older times (and, thereby, increasingly older images). Using the curve of FIG. 8A, therefore, each time difference can be correlated to a particular confidence weighting value. As shown the weighting decreases as the images get older, thereby reducing the effect of confidence scores associated with objects identified in the older images on the confidence score of the current image being processed. In some embodiments, the weighting curve depicted in FIG. 8A may be adjusted based upon one or more attributes of the system. For example, the curve may be modified if the system determines that the camera of the system is moving. For example, if the camera is moving, the weighting curve may be further discounted (e.g., by more aggressively reducing the weighting value allocated to older images) than if the camera is determined to be stationary. The weighting curve may be so adjusted because if the camera is moving, there is an increased likelihood that object identifications made in older images are less relevant to a current object identification, than if the camera has been stationary for an extended period of time.

Figure 8B:
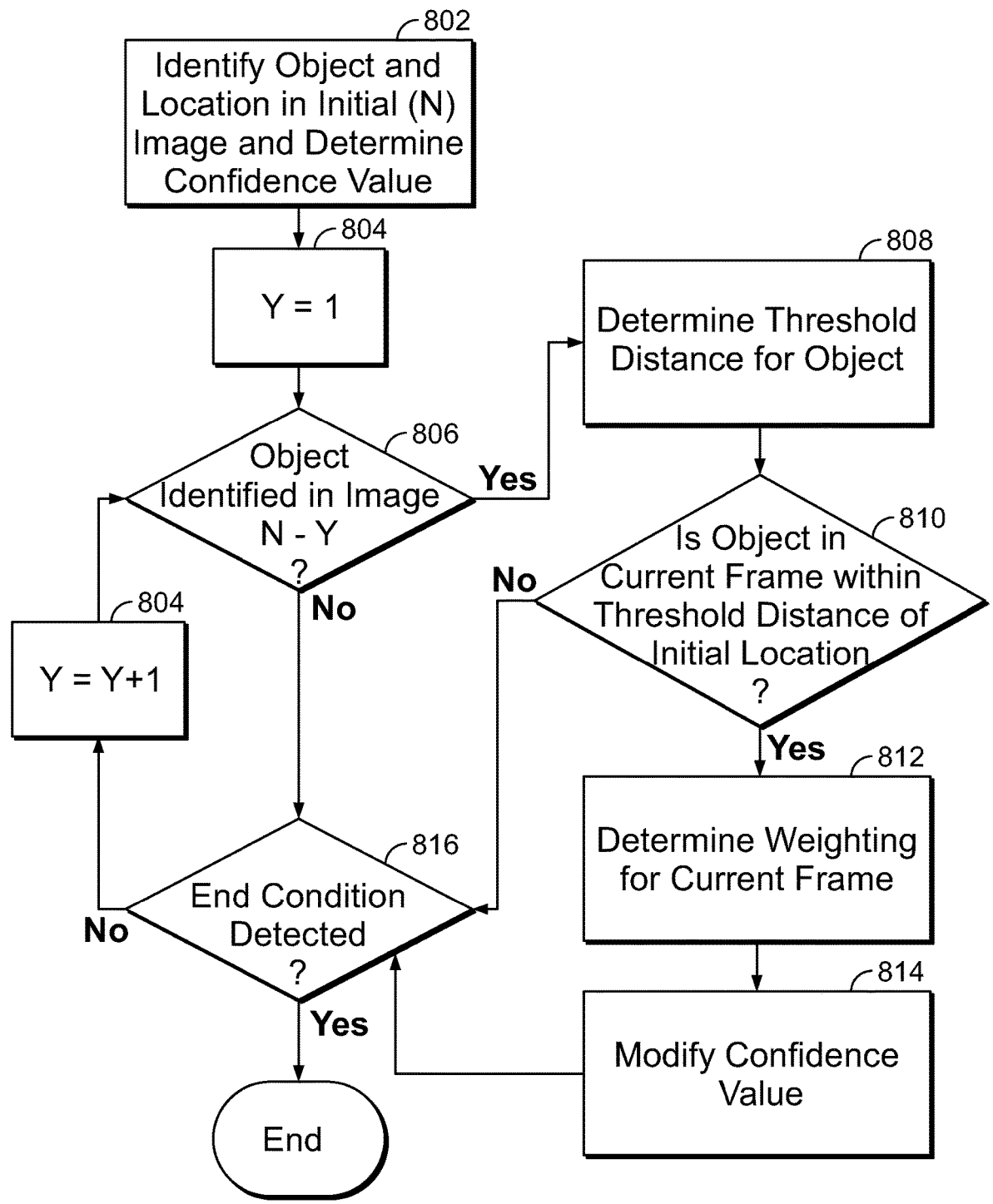
FIG. 8B is a flowchart depicting an algorithm for determining a confidence value for an object identification based upon an analysis of multiple images captured by a device's camera.

FIG. 8B is a flowchart depicting an algorithm for determining a confidence value for an object identification based upon an analysis of multiple images captured by the device's camera. The algorithm may be implemented by a system controller, such as system controller 322. In step 802 an initial image or frame (N) is analyzed to identify object representations appearing in the image, as described herein. In that initial identification, the geographical location of the identified object is determined, as well as a confidence score. In step 804, having generated an initial object identification, a counter Y is set to a value of 1. In step 806, the image N−Y (i.e., the previous image) is analyzed to determine whether the same object is depicted in the previous image. If so, in step 808 a threshold distance is determined for the object. The threshold distance is the maximum distance that the object can have moved from one image to the next and still be considered the same object. For stationary objects (e.g., trees or road signs), the distance may be very small (or in some cases, zero)—essentially a margin of error, but for objects that are typically mobile (e.g., animals or people), the threshold distance may be greater. Threshold distances may be stored in a look-up table (e.g., in memory 328) that may define threshold distances for various classes or types of object, as well as specific object types.

In step 810 a determination is made as to whether the object identified in image N−Y is located within a threshold distance of the initial location determined for the object in step 802. If so, in step 812 the weighting value for the current frame is determined (e.g., using the curve of FIG. 8A) and in step 814 the initial confidence value is modified based upon the weighting and the confidence value of the object identification of image N−Y.

After modifying the confidence value, in step 816 a determination is made as to whether an end condition for the method is detected. Various end conditions may be defined for the method of FIG. 8B. For example, the method may end when a particular number of additional images have been analyzed or the confidence value exceeds a threshold confidence value indicating that the system is almost certain that the object has been successfully identified. In some cases, an additional end condition may be defined as the applicable weighting falling below a particular threshold weighting. If the end condition has been detected, the method ends. If not, the value of Y is incremented in step 818 so that in the next iteration of the method an older image is analyzed and the method return to step 806.

Upon completion of the method of FIG. 8D, an adjusted confidence score for the current object identification has been generated.

Returning to FIG. 4, in step 416, the object identifications of objects identified in the current image being processed, object locations, and adjusted confidence values are outputted by remote image processing system 404 and transmitted to the device's controller (e.g., system controller 322 of device 300).

While the remote image processing system 404 analyzes images in image data stream 402 to identify and locate objects using those images, local image processing system 406 similarly processes the images of image data stream 402. As in the case of remote analysis, the local image processing system 406, in step 418, receives an image from image data stream 402 and analyzes the image (e.g., utilizing object detection module 230 of FIG. 2) to identify objects depicted within the image. Each object identification is associated with a confidence score, indicating a probable level of accuracy of the object identification. As described above, local image processing system 406 may use a reduced object dictionary, so that the object identifications generated by local image processing system 406 may not be as accurate or precise as those generated by remote image processing system 404. As such, the object identifications generated by local image processing system 406 may have lower confidence scores than those generated by remote image processing system 404.

For example, returning to FIG. 5A, local image processing system 406 may identify object 502 representation as a "vehicle" with a first confidence score, object 504 representation as a "traffic light" with a second confidence score, and may be unable to identify object 506, for example. For FIG. 5B, local image processing system 406 may identify object 508 representation as a "person" with a first confidence score and object 510 representation as a "person" with a second confidence score.

In step 418, for each identified object, local image processing system 406 generates a bounding box around the object, identifies a center point of the bounding box and, as described above, determines a location of the object. The object location may be expressed, initially with respect to the position of the camera that captured the image data stream 402. Accordingly, the location of the various objects could be expressed with reference to the location of the user wearing the camera (e.g., "the person is four feet in front of you, or "the traffic light is 50 feet ahead of you") but, using the location metadata received with image data stream 402, which specifies the location and orientation of the camera at the time the image was captured, the relative position of the object with respect to the camera can be converted into a geographical location of the object in the real world.

In step 420, local image processing system 406 inspects previously-analyzed images of image data stream 402 to determine whether the same object identification was made in a previously-analyzed image. If the same object is identified in multiple images of image data stream 402, that may indicate an increased likelihood that the object was accurately identified. As such, if the same object is identified in multiple images, the confidence score associated with that object identification may be increased accordingly.

In addition to confirming that a particular object was identified in multiple images of image data stream 402, remote image processing system 404 also determines whether the same object that was identified in other images was also at a location in the previous frames that is consistent with the object's location in the current images. By confirming that the object's geographical location is consistent through the multiple images, local image processing system 406 can prevent false positives from artificially increasing the confidence score associated with a particular object identifications.

Accordingly, having identified an object and the geographical location of the object depicted in the current image being processed, local image processing system 406 determines whether, in previous images, objects having the same identification were identified and located in the same geographical location. The objects identified in multiple images may be considered to be within the same geographical location if their locations differ by less than a margin of error distance. In some embodiments, depending upon the class of object, the margin of error may be adjusted. For example, the margin of error for locations of immobile objects (e.g., trees, houses, road signs, etc.) may be relatively small (e.g., less than 2 feet or 3 feet) because their location should not change from one image to the next. But the margin of error for moveable objects (e.g., people, animals, cars, etc.) may be much larger (e.g., 25 feet or 50 feet) as the location of those objects can change from one image to the next.

If the same object is identified in multiple images of image data stream 402, the confidence that the object has been correctly identify can be increased compared to instance where an object may only be identified in a single image. To modify confidence scores based upon detection of the same object in a consistent location in previous images or frame, the confidence scores associated with the object identifications in each image may be combined together.

In an embodiment, the confidence scores associated with each object identification may simply be added together. But in another approach, because the object identifications in older images may become stale and less reliable over time, a multiplication factor or weight may be used to reduce the confidence scores associated with older object detections. For example, the weight for confidence values in the current image (N) being processed may be equal to 1, the weight for confidence values in the N−1 image being processed may be equal to 0.9, and the weight for confidence values in the N−2 image being processed may be equal to 0.8. In another example, the weightings associated with confidence scores for object identification in older images may be generated accordingly a curve, such as the weighting curve depicted in FIG. 8A.

As described above, FIG. 8B is a flowchart depicting an example algorithm for adjusting confidence scores associated with object identifications that may be implemented by local image processing system 406.

Finally, in step 422, the object identifications of objects identified in the current image, object locations, and adjusted confidence values are outputted by local image processing system 406.

Because local image processing system 406 may process images from image data stream 402 more quickly than the remote image processing system 404, local image processing system 406 may be used to quickly detect potential collisions or obstacles that may appear in the images being processed. Accordingly, as part of step 420 and, specifically, based on the object geographical locations determined over a number of different images from image data stream 402, a system controller (e.g., system controller 322) can analyze the movement of identified objects over time to identify potential collision conditions. This may involve, for example, the system controller determining, over time, a path of travel of the identified objects. Additionally, a path of travel of the system's camera (and, by inference, the system's user) can be determined by an analysis of how the location data associated with the camera changes over time. Then, by analyzing the travel paths for identified objects and the system's camera, the system controller can determine whether any of the identified objects are going to cross the user's path at a location that will be occupied by the user. Accordingly, the system determines whether the travel paths of any identified object will intersect the travel path of the user, as determined by the travel path of the system's camera. In that case, a collision with the object may occur and the user can be informed of the potential collision condition using the feedback techniques described herein.

If the controller identifies a potential collision condition, in step 424 a user alert is generated (e.g., via output system 316) to alert the user of the potential collision condition. The alert can indicate the direction from which the potential collision source is originating relative to the user as well as identify the object itself based upon the object identifications received in step 422.

In a third pipeline of FIG. 4, obstacle detection system 408 also receives and processes image data stream 402. Obstacle detection system 408 is configured to quickly detect potential obstacles that are present directly in front of the device's user. Accordingly, in step 410 obstacle detection system 408 analyzes the central region of a current image from image data stream 402 to determine whether an object is present in the central region of the image. In embodiments, this may involve obstacle detection system 408 determining whether an object is presented at the very center of the image captured by the system's camera. Obstacle detection system 408 does not try to identify the object in the central region of the image. If an object is present, obstacle detection system 408 (e.g., using object detection module 230) determines a distance between the camera that captured the current image and that object. Obstacle detection system 408 performs the same analysis on a sequence of images from image data stream 402 captured over time and, if the distance is decreasing and falls below a threshold, in step 424 obstacle detection system 408 generates an alert to warn the user of a potential obstacle. The alert can be generated through output system 316 and may alert the user to the presence of a potential obstacle, as well as notify the user of a distance to that obstacle. In other embodiments, obstacle detection system 408 may be configured to monitor other regions of the images captured by the system's camera to identify potential hazards. For example, in addition to determining whether an object is present in the central region of the image that may present a collision hazard or obstacle, obstacle detection system 408 could also monitor a lower region of the image in which potential tripping hazards are likely to occur. If an object is identified in such a lower region within a threshold distance of the user, the user can be notified of a potential tripping hazard. Similarly, obstacle detection system 408 may also monitor an upper region of the image to identify objects that are at head height. If an object is identified in such a higher region of the image, the user can be notified of a potential hazard that may strike the user's head.

As the remote image processing system 404 and local image processing system 406 operate, each system transmits output including object identification, confidence scores, and object locations (both relative to the location of the camera generating image data stream 402 and real-world geographical locations) to a system controller for processing. Because the remote image processing system 404 and local image processing system 406 use different object dictionaries, the remote and local system may report different object identifications at different confidence scores. Specifically, the object identifications generated by local image processing system 406 may be more generic (e.g., identifying a "vehicle") and typically at a higher confidence score, while the object identifications generated by remote image processing system 404 may be more specific (e.g., identifying a "red truck") but at a lower confidence score. Accordingly, the controller is configured to analyze the object identifications generated by the output of each system in a consensus step 417 in order to determine a consolidated object identification. If, for example, both the location and remote image processing systems identify, in the same image or frame, the same object, a consolidated confidence score for the object identification may be determined by simply calculating an average value of the confidence levels of the local and remote image processing systems for the object identification.

If, however, the local and remote image processing system identify different objects, the controller may first determine whether the objects identified by the local and remote systems are related. Specifically, the controller determines whether one of the object identification describes a more specific type of object than the other object identification. For example, if the local image processing system identified a "vehicle" object, and the remote image processing system identified a "truck" object, the controller may determine that the truck object is a more-specific type of the vehicle object and, as such, both of the object identifications are of the same object. To make this determination, the controller may access a hierarchical table of object types (e.g., stored in a memory, such as memory 328), which defines the relationship of multiple object types and, specifically, defines which objects are more precise types of other object types. Where the remote image processing system has a larger dictionary than the local image processing system, the table of object types may associated each object type in the remote image processing system with one of the object types in the local image processing system's dictionary. Table 1, below, shows an example object type table that identifies related object types that may be identified by the local and remote image processing systems.

TABLE 1

| Local Image Processing System Object Type | Related Remote Image Processing System Object Type |
|---|---|
| Vehicle | Truck |
| Vehicle | Car |
| Vehicle | Motorcycle |
| Dog | German Shepard |
| Dog | Pug |
| Dog | Golden Retriever |
| Dog | Brussels Griffon |

If the controller determines that the object type identified by the local image processing system is related to the object type identified by the remote image processing system, the controller may determine a consolidated confidence score for the object identifications by calculating an average value of the confidence levels of the local and remote image processing systems for the object identification. The controller may then select the more precise object identified (which will typically be determined by the remote image processing system) and designate that object identification as the consolidated object identification. Accordingly, if, with reference to Table 1, the local image processing system identifies a dog object in a particular image at a first confidence score, but the remote image processing system identifies a Pug object in the same image, the controller may determine that the two object identifications are of the same object, per Table 1. Because the pug object is more precise, that identification may be used as the consolidated object identification. Additionally, because the two object identifications are so related, the confidence scores reported for the object identifications by the local and remote image processing systems may be combined as discussed above to determine a consolidated confidence score for the object identification.

If, however, the object identifications returned by the local and remote image processing systems are not related (e.g., the local system identifies a "vehicle" object, while the remote system identifies a "horse" object), the two object identifications may be discarded as the discrepancy indicates that the object identification of at least one of the local and remote system is incorrect.

As described above, in steps 414 and 420 the remote image processing system 404 and local image processing system 406, respectively, refine the confidence of object identifications based upon whether the same object has been identified in other images retrieved from image data stream 402. This analysis, however, may become more complicated if several of the same objects are depicted in the series of images. If an object is in a category that tends to be static and unmoving (e.g., trees or buildings) it may be possible for the local or remote system to track the object through multiple images based upon the geographic location information associated with the object, even if other similar objects are present in the image data. But if the object is in a category that may be capable of movement (e.g., animals, people, vehicles, etc.), it may be different to track the object through multiple images if other similar objects are also present in the images.

Figure 9A:
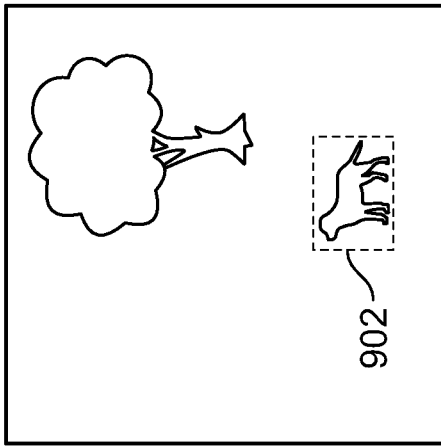
FIGS. 9A-9F depict a first series of images that may form part of an image data stream in which multiple similar objects are depicted in some of the images.
Figure 9D:
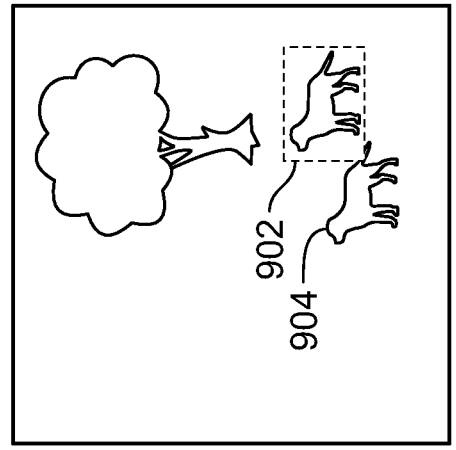
Figure 9B:
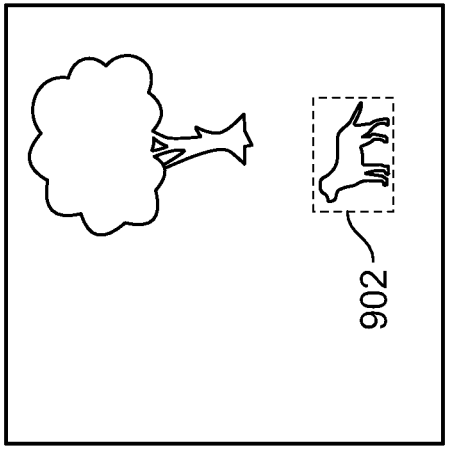
Figure 9E:
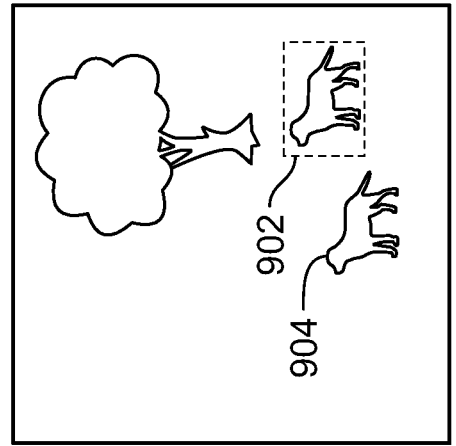
Figure 9C:
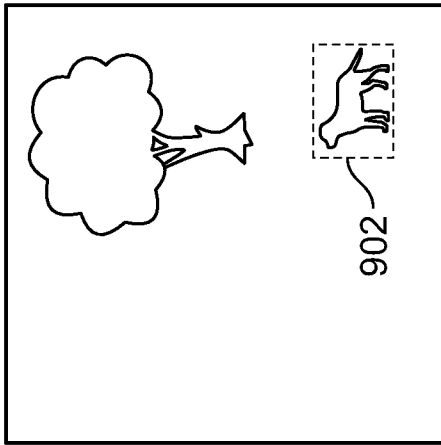
Figure 9F:
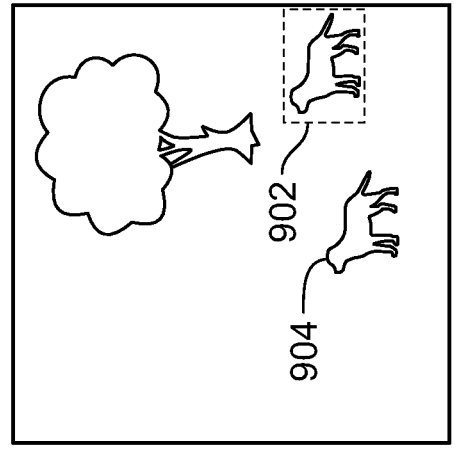
Figure 10A:
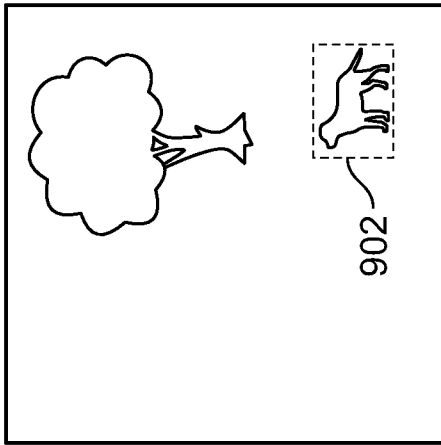
FIGS. 10A-10F depict a second series of images that may form part of an image data stream in which multiple similar objects are depicted in some of the images.
Figure 10B:
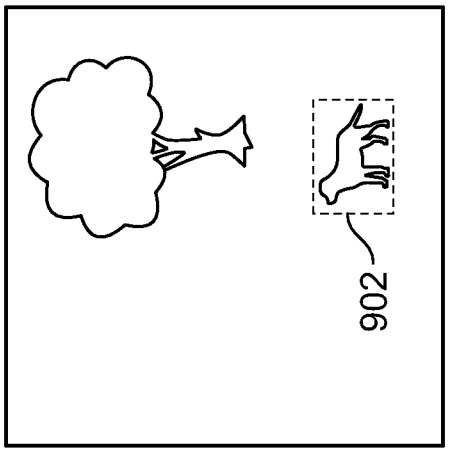
Figure 10C:
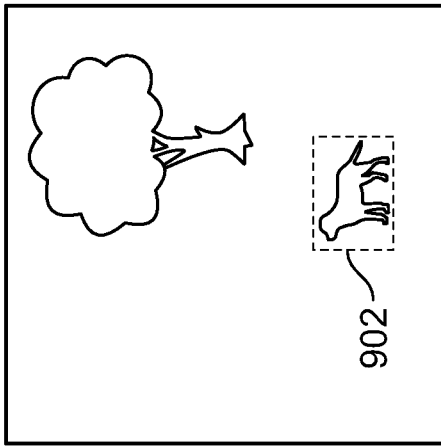
Figure 10D:
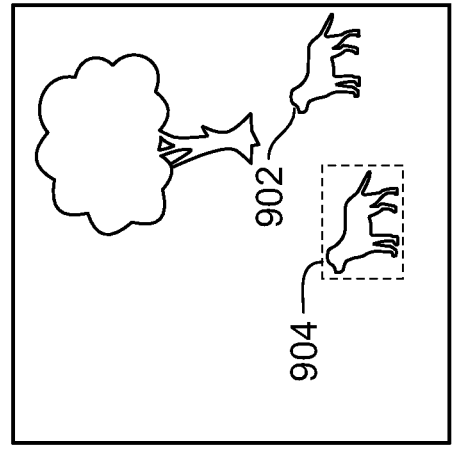
Figure 10E:
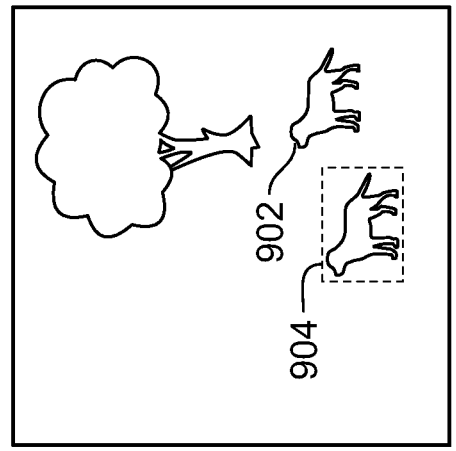
Figure 10F:
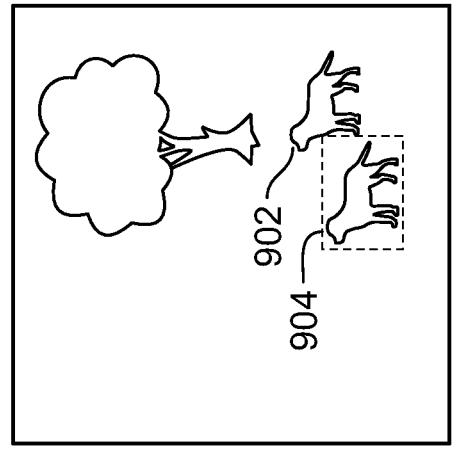

To illustrate, FIGS. 9A-9F depict a series of images that may form part of image data stream 402. The initial images (FIGS. 9A-9C) depict a scene in which a single dog is present. But in FIGS. 9D-9F a second dog enters the scene. If either of remote image processing system 404 or local image processing system 406 attempts to track the dog object 902 identified in the first image through the multiple images of FIGS. 9A-9F, the presence of the second dog object 904 can create some uncertainty for object tracking. Specifically, upon identifying the dog object 902 depicted in the first image FIG. 9A from image data stream 402, the image processing systems will analyze other images from the image data stream to determine whether the same dog object 902 was identified in those images per steps 414 and 416. The system determines that in FIGS. 9B and 9C dog objects 902 were identified in locations that fall within a margin of error distance from the dog object 902 in the initial image of FIG. 9A. But in FIG. 9D, two dog objects 902 and 904 were identified. Additionally, both dog objects 902 and 904 in FIG. 9D are determined to be within the margin of error distance of dog object 902 in FIG. 9A. Accordingly, both dog objects identified in FIG. 9D could plausibly be the dog object that was identified in FIG. 9A. In this situation, the image processing system (either local or remote) designates one of the dog objects 902 or 904 in FIG. 9D to be the dog object identified in FIG. 9A. With dog object 902 designated in FIG. 9D, the imaging system continues the analysis in FIGS. 9E and 9F. In this manner, the system tracks the dog object 902 of FIG. 9A through each of FIGS. 9B-9F to create a sequence of object identifications that track a candidate movement of dog object 902 over time from one image to the next. However, due to the uncertainty created by the presence of dog object 904 representation in FIG. 9D, there is a risk that the system selected the wrong dog object in FIG. 9D and, in fact, designated a different dog object in FIGS. 9D-9F than the dog object that was originally identified in FIG. 9A. Accordingly, the imaging system also creates a second sequence of object identifications in which the alternate dog object is designated. This is depicted in FIGS. 10A-10F that show the same sequence of images as FIGS. 9A-9F, but with a different dog object designated in FIGS. 10D-10F.

Having generated multiple sequences of object identifications through multiple image frames, the system scores each sequence. Typically, each sequence is scored by combining (e.g., by determining an average of) the confidence scores associated with each object identification in each image of the sequence. In some cases, the confidence scores may simply be summed together, in other cases a weighting scheme may be utilized (see, for example, FIG. 8A) so that the confidences associated with older object identification can be discounted to some degree. The sequence associated with the highest confidence score then then be identified. And, having identified a best sequence of object identifications through the multiple images, the local and remote image processing systems can perform confidence adjustments based upon the designated object identifications in each image.

Figure 11:
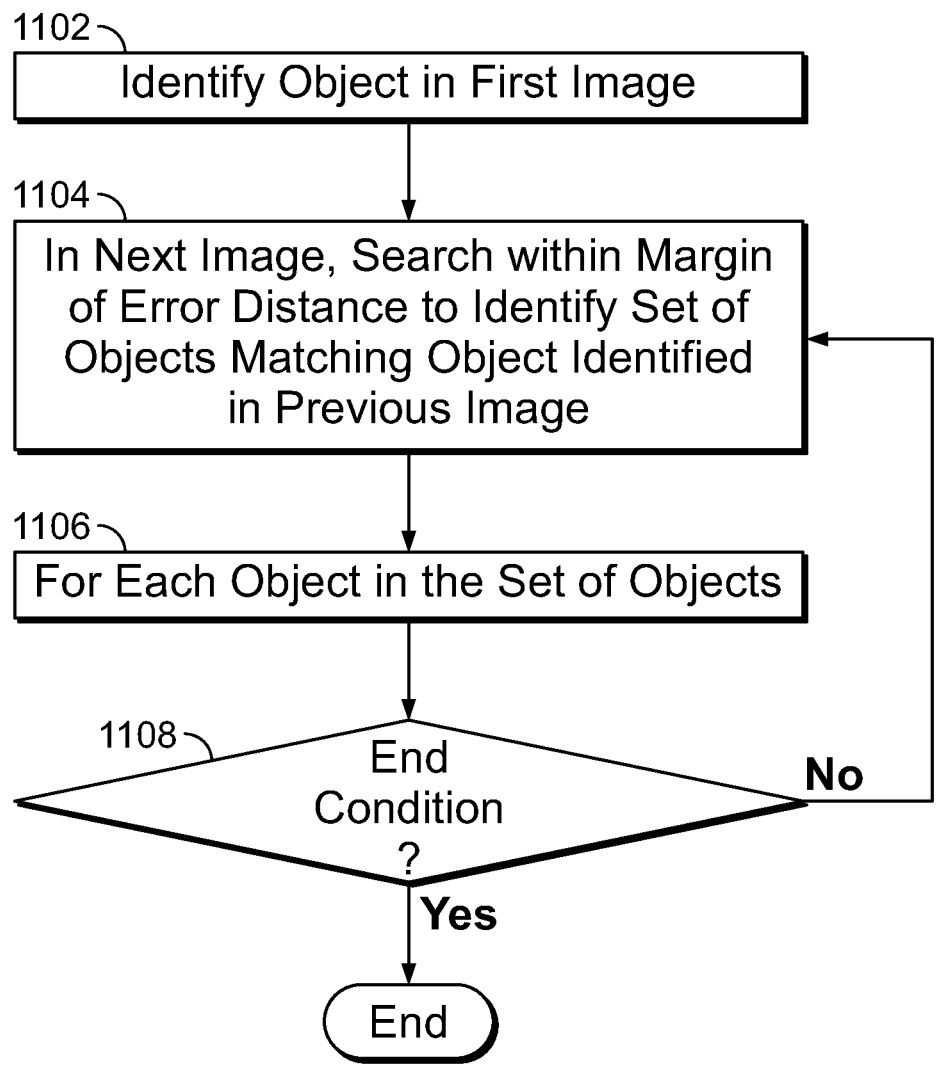
FIG. 11 is a flowchart depicting an example recursive algorithm that may be used to generate sequences of potential object identifications across multiple images.

To construct candidate sequences of object identifications, the image processing system typically implements a recursive algorithm, in which each potential sequence is generated and then scored to identify the sequence that most likely identifies the same object in all analyzed images. FIG. 11 is a flowchart depicting an example recursive algorithm that may be used to generate sequences of potential object identifications across multiple images. In step 1102 an object is identified in an initial image from image data stream 402. This is the object that will be tracked through multiple images to generate candidate sequences. With the object identified in step 1102 a margin of error distance from one image to the next is determined for the object. As discussed above, for objects capable of moving from one image to the next (e.g., people or animals), a threshold margin of error distance may be defined that described the maximum distance such a moveable object is likely to move from one image to the next.

With the margin of error distance determined, in step 1104 the next image in the sequence is analyzed to identify any object representations that match (i.e., are the same type of object) the object identified in step 1102 where the objects are located within the margin of error distance of the object identified in step 1102. As discussed above, if the next image includes multiple objects of the same type (e.g., multiple dogs, or multiple red ford trucks), multiple matching objects may be within the margin of error distance. With the set of potential matching objects identified in step 1104, in step 1106 the method iterates through each of the objects identified in step 1104.

For each object in the set of potential matching objects identified in step 1104, the method returns to step 1104 to determine, for each object, if there are potentially matching objects within the margin of error distance in further subsequence images of image data stream 402. Each time the method iterates, in step 1108, an exit condition is evaluated. If an exit condition is detected, the method will end, if no exit condition is detected, the method will continue to iterate. Example exit conditions may include the method having performed an analysis of a predetermined threshold number of images (e.g., upon performing the analysis through 10 different images, the method will end), or having been executed for a predetermined period of time (e.g., 500 milliseconds or 2 second, or the like).

As the method of FIG. 11 is executed, a number of different sequences of object identifications are created that track an object through a number of different images. With the potential object identification sequences created, the sequences can be analyzed, as described above, to determine a sequence that most probably correctly tracks the object identified in step 1102 through the number of images from image data stream 402.

With objects in the images of image data stream 402 identified and their geographic locations determined, the system can provide useful information to a user regarding the objects that are present in the user's environment. As the system controller processes the object identifications received from remote image processing system 404 and local image processing system 406, the system controller can inform the user (e.g., via output system 316) of objects in the user's environment. Typically, this involves the system controller determining that an object identification received from the processing system is new to the user—that is, the user has not been notified that the object is present for a threshold period of time (e.g., five minutes or 10 minutes). If a particular object identification is new to the user, the system controller can generate an output at output system 316 notifying the user of the object's existence and a description of the object's position with respect to the user (e.g., "there is a dog 5 feet in front of you"). When notifying the user of objects identified by the image processing system, the system controller may prioritize notifying the user of certain objects or certain types of objects. Specifically, when the user is in certain environments, the user may preferentially be notified of the presence of certain objects.

For example, if the user in or near a street, the user may preferentially be notified of the presence of curbs, traffic lights (and their status), and the like. If the user is in the outdoors (e.g., walking through a park), the user may preferentially be notified of the presence of navigation signs, trail markers, or maps and sharp drops or other hazards commonly found in the outdoors. In these cases, the system may further monitor these objects to detect changes over time, and the user may be alerted to any detected changes.

Figure 12:
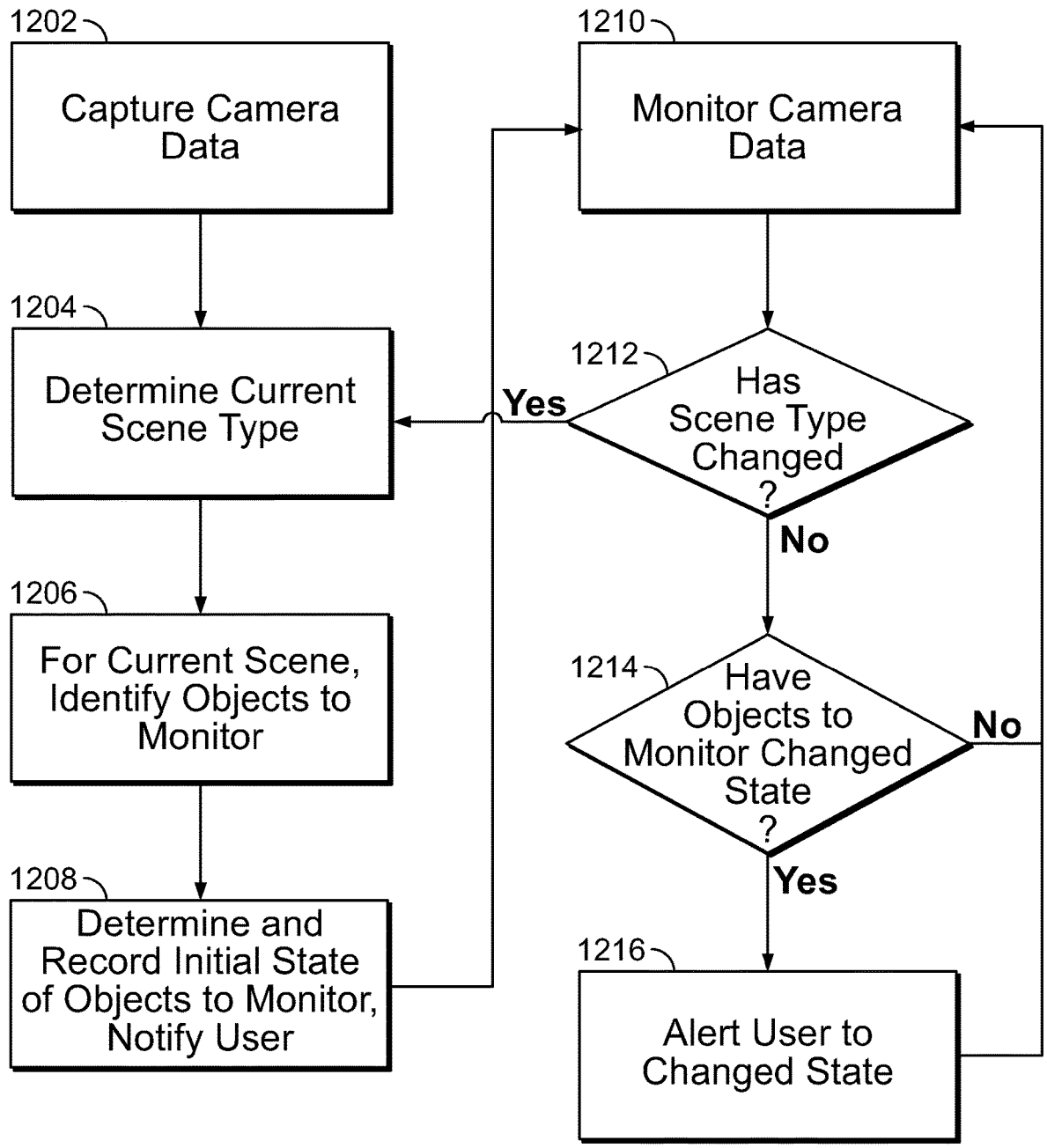
FIG. 12 is a flowchart depicting a method for identifying certain objects in a particular scene type and preferentially notifying a user of an attribute of those objects.

To illustrate, FIG. 12 is a flowchart depicting a method for identifying objects in a particular scene to which the user should be notified. In step 1202, camera data (e.g., image data stream 402) is captured from the device's camera. The camera data is then analyzed according to the methods described herein to perform object detection and identification (e.g., using object detection module 230 or object detection module 240). Then, based upon the set of objects detected, in step 1204 a current scene (i.e., a description of the type of environment) for the image is determined. As discussed above, the scene describes the type of environment in which the images have been captured by the device's camera. In step 1206, based upon the current scene, the system controller determines a set of objects that are to be preferentially identified and monitored in the current scene. This may involve the system controller accessing a look-up table that maps objects to be monitored to particular scene. Table 2, depicts an example look-up table that designates for particular scene, the objects to be monitored.

TABLE 2

| Current Scene | Objects to monitor | State Changes to Detect |
| --- | --- | --- |
| Street | Traffic lights | Visual Change |
| Street | Cross-walk instructions | Visual Change |
| Street | Curbs | Proximity Warning Within 5 feet |
| Airport | Gate Monitors | Visual Change |
| Airport | Baggage Carousels | Movement Change |
| Outdoors | Sharp Drops | Proximity Warning Within 5 feet |

Figure 13A:
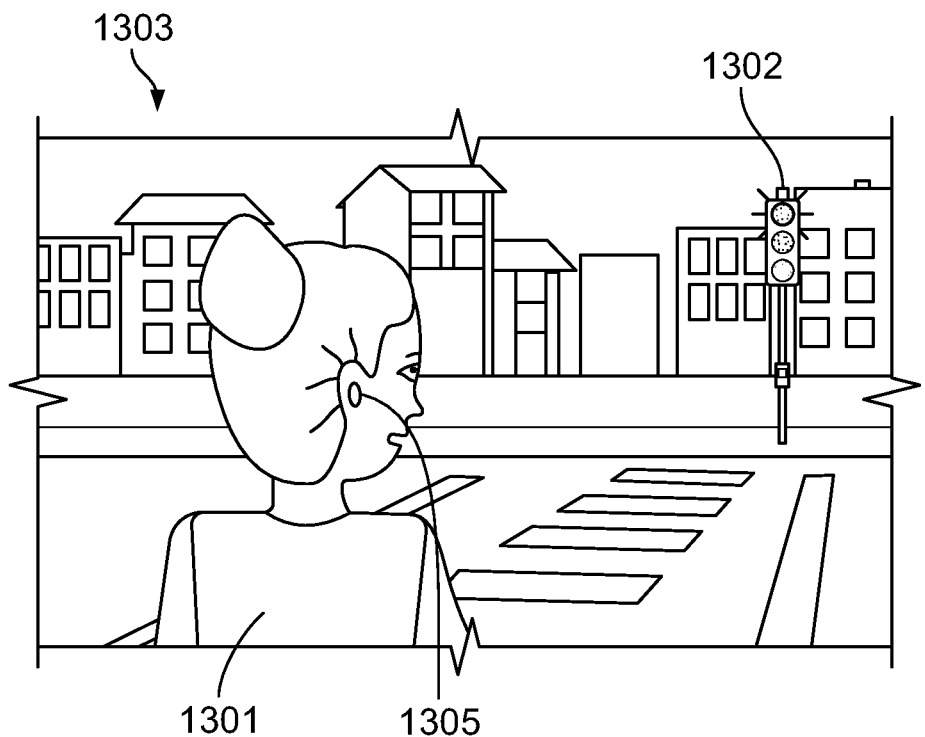
FIGS. 13A and 13B depict images having a scene type of street and including traffic lights, where the user is preferentially notified of a current state of the traffic lights.

In step 1208, with the set of objects to be monitored identified, the system controller monitors the object identifications generated by the image processing systems to detect when one of the objects to be monitored has been identified in the image data. If so, in step 1208 the user is notified that the object has been detected. Additionally, the initial state of the object is recorded. For example, if the user is in the street scene 1303 depicted in FIG. 13A, the camera data captured by the camera worn by user 1301 may include a representation of traffic light 1302, which is an object to be monitored in a street scene (see Table 2). Accordingly, the user is notified of the existence of the traffic light and the traffic light's current status. For example, an audio notification may be provided through headphones 1305 of output system 316 to notify the user that there is "a traffic light 40 feet ahead of you, the light is red."

Returning to FIG. 12, in step 1210 as the camera continues to capture more images of the user's environment, the camera data is monitored and in step 1212 the system controller determines whether the scene type has changed. If so, the method returns to step 1204 to determine the new scene type.

Figure 13B:
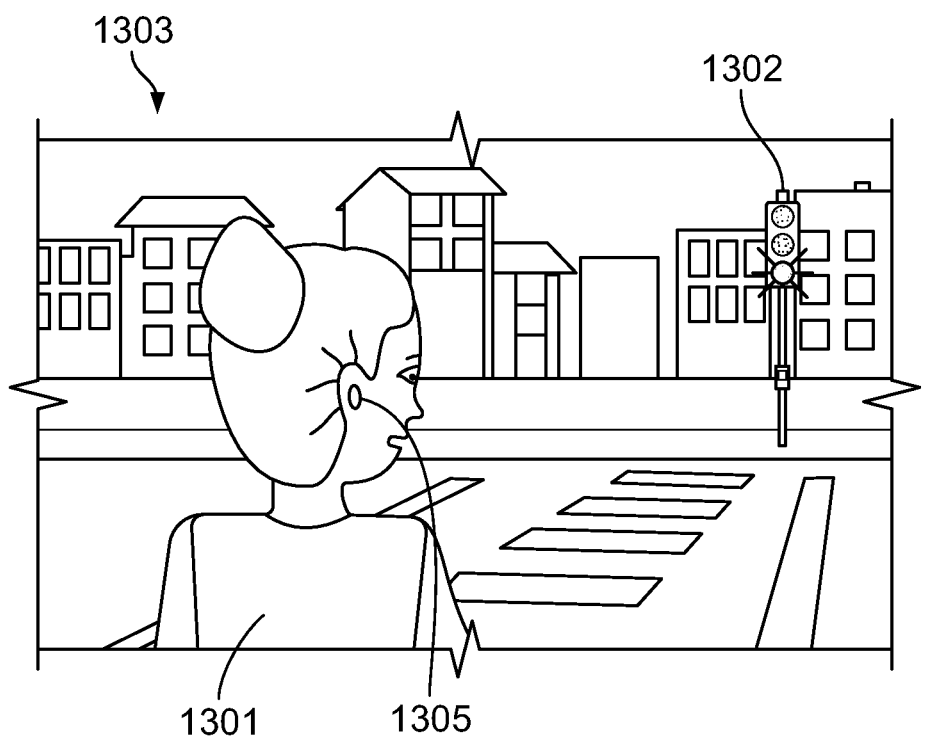

If the scene type has not changed, in step 1214 the system controller determines whether the status of one of the objects to be monitored has changed state from the initial state determined in step 1208. If so, in step 1216 the user is notified of the status via output system 316. For example, in FIG. 13B, the state of traffic light 1302 has changed to become a green light and, as such, the user will be notified of the status change. As depicted in Table 2, status changes for different objects may involve the changing of different attributes of the objects. With reference to the traffic light, the status change requires a visual change to the traffic light. A visual change to the traffic light can be detected based upon the object identification information received from the image processing system. In the case of a curb, however, another object to be monitored when the user is in a street scene, a status change does not involve the curb changing appearance, but rather on the relative position of the curb to the user. Based upon the location of the curb object generated by the image processing system, the system controller can determine that the curb has changed state to being within a threshold distance (e.g., 5 feet) of the user. In an airport scene, baggage carousels may be designated as objects to be monitored. In that case, a state change of a baggage carousel may involve the carousel transitioning from a moving state or a non-moving or static state or vice versa.

After notifying the user of any state changes in objects to be monitored, the method returns to step 1310 with image data captured by the device's camera is again monitored and analyzed by the image processing systems.

In some cases, the user may be notified of particular objects regardless of the current scene. For example, both local and remote image processing systems may be configured to implement facial recognition to detect individuals that are known to the user. If the system detects an individual having a face of an individual known to the user, the system will notify the user of the presence of that individual. This can aid the user in navigating to such a known contact, for example. In the case of facial recognition, the system may also, in some cases, implement mood detection to detect a mood of the recognized individual. If a particular mood is detected, the user may additionally be notified of the same.

As discussed above, the image processing systems may also detect text data appearing in images captured by the device's cameras. In particular scenes, such as in a restaurant or in a store, the user may be preferentially notified of text data detected by the image processing systems. In response to being notified of the presence of detected textual data (e.g., in a restaurant menu or on the packaging of a good being offered for same), the user can instruct the present device (e.g., via a verbal command provided through microphone 312) to read the textual data to the user or to provide further information. For a product, this could involve provide more information about the product or determining the product is on offer for sale with other merchants at a cheaper price, for example.

In some cases, historical data captured by the device may be utilized to identify objects to which the user should be notified. The historical data could be generated by the device's system controller 322 storing object identifications and their locations in memory 328 for an extended period of time (e.g., several weeks). This historical data, once stored can assist in characterizing the types of objects that are typically identified in particular geographic locations. Because a typical user may follow routines that bring the user back to the same geographical locations time and again, the historical information describing typical objects observed in typical locations can be used to identify unusual or unique objects, the existence of which should be alerted to the user.

Accordingly, for a particular scene type or a particular geographical area, the object identifications generated by the local and remote image processing systems can identify set of objects that are typically found in the particular scene or geographical area. Then, when the user navigates through a particular scene or area, the user can be notified of any objects that are identified that are not typically found in the scene or area. For example, the user may live in a neighborhood. As the user walks around his or her neighborhood, objects that are typically observed and identified may include cars, trees, people, dogs, and the like. But, on a special occasion, a neighbor may be having a party and, as a result, a food truck may be parked outside the neighbor's house. As food trucks are not the type of object that have been typically observed in the user's neighborhood, the user may be preferentially notified of the presence of the food truck. Not only can this approach notify the user of interesting objects that may be present within the user's immediate environment, but this may also allow the user to be notified of potential risky situations or conditions in which the presence of unusual objects (e.g., fallen trees, police cars, or large crowds) may be evidence of the risky situation.

In some cases, the historical information may also be utilized to assist in a user in finding particular objects. For example, if the user has lost his or her keys, the user can ask the system, via audible command provided into microphone 312, to search for the user's keys. Upon receiving the command, the system can search through the historical data to determine whether any key objects have been previously identified. If so, the system can notify the user that the request object (in this example, keys) has been previously identified and notify the user of the time and location when the object was identified. To ensure that the system generates historical location data for certain objects, the user may provide the system with a list of objects that are also be searched for in images captured by camera 310 and, if detected, the objects location as well as the time the object was identified should be stored in historical data. Examples of such objects may include the user's keys, television remotes, wallets or purses, or other objects that the user has a tendency to misplace.

To assist the user in navigating particular environments, the present device (and, specifically, system controller 322) may be configured to automatically detect potential waypoints that can be used in the future to aid a user's navigation. In one case, potential waypoints may be detected when the image processing systems determine that the images being captured by camera 310 have transitioned from a first scene type into a second scene type. For example, if the images are initially associated with a scene typically occurring inside a building (e.g., an office scene), but then the images from the image data stream transition into an outdoors scene (e.g., on a street), that typically indicates that the user of the device has exited the building containing the initial office scene and is now on the street outside the building. Accordingly, the location of the user (as determined by the location of camera 310) at the time the image data stream 402 transitioned from containing images of an office scene to images of a street scene will typically indicate the location of the building's exit. Accordingly, that location can be stored and utilized in the future to assist the user in finding the building's exit. If both scenes are associated with public locations (e.g., a public office building and public street location), the determined location of the building's exist could be stored in a public data accessible to other users to assist those users in also finding the building's exit. Table 3, below, provides some examples of different scene transitions that may indicate the existence of an interesting waypoint at the camera's location when scene transitions occur.

TABLE 3

| Previous Scene | Current Scene | Way Point Indicator |
| --- | --- | --- |
| Inside Building | On Street | Building Exit |
| Train Platform | Inside Train | Train Loading Area |
| Street | Inside Bus | Bus Stop |
| On Street | Inside Building | Building Entrance |
| Inside Vehicle | Outside Vehicle | Parking Area |

Figure 14:
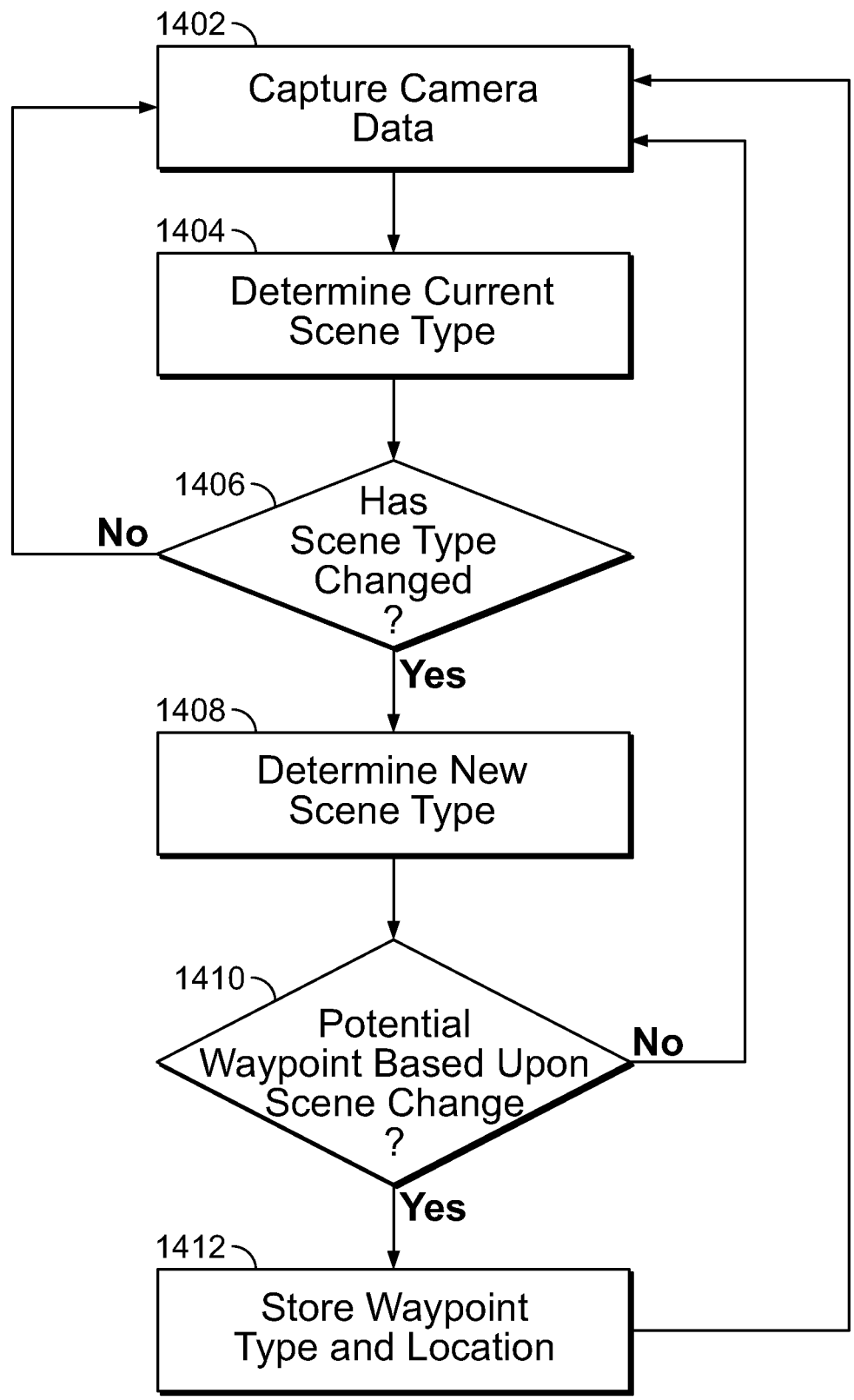
FIG. 14 is a flowchart depicting a method for determining waypoint locations based upon scene transitions occurring in an image data stream captured by a device's camera.

FIG. 14 is a flowchart depicting a method for determining waypoint locations based upon scene transitions occurring in an image data stream captured by the device's camera. In step 1402 image data (e.g., image data stream 402) is captured from the device's camera. As discussed above, the camera continually generates a data stream of images that are continually analyzed by the image processing system of the present system. In step 1404, one or more images from the image data stream are analyzed to determine their scene type. Because a user may move about a particular scene, the scene determination may be relatively unstable. Accordingly, a number of images from the image data stream may be analyzed to determine their scene types and then a scene type may only be determined when the scene types of the individual images has become relatively stable and unchanging (e.g., the scene type is unchanged for 5 sequential images).

Having determined an initial scene type, images in the image data stream generated by the device's camera are continually monitored and in step 1406 the system determines whether the current scene type has changed. If not, the method returns to step 1402 and the image data stream continues being monitored and the scene types determined. But if the scene types has changed, in step 1408 the new scene type is determined. In step 1410 the controller determines whether the scene type change triggers the creation of anew waypoint. For example, with reference to Table 3, above, the controller may determine whether the detected scene type change is associated with a particular type of potential waypoint. Some scene changes will not be associated with potential waypoint. For example, if the user is walking through a parking, the user may transition through several scene types (e.g., from woodland to open areas), whose transitions are not typically associated with well-defined waypoints. But, as seen in Table 3 some scene type transitions correlate strongly with particular types of waypoints.

If the present scene type transition is not associated with a well-defined waypoint, the method returns to step 1402 and the image data stream is monitored for further scene type transitions.

If in step 1410 it is determined that the detected scene type transition is associated with a particular type of way point, in step 1412 a waypoint is created. To generate a waypoint the controller records in memory (e.g., memory 328) a description of the type of waypoint being generated (the waypoint type may be specified in Table 3, for example) as well as a location of the waypoint. The waypoint location may be determined by the location of the device's camera associated with an image from the image data stream that was captured as the image data stream transitioned from the first scene type to the second scene type.

Although scene type transitions can be used to automatically generate waypoints, other techniques may be utilized to automatically generate waypoints. For example, if the user is in a particular scene type, the identification of certain objects in the image data stream may trigger the creation of waypoints associated with those objects. For example, if the user is in a store or supermarket, the system may be configured to look for particular objects and, if the object is identified in the device's image data stream, record a location of the object as a future waypoint. Table 4, below, provides some examples of particular objects that, if identified in particular scenes, trigger the generation of a waypoint.

TABLE 4

| Current Scene Type | Objects to Record as Waypoints |
| --- | --- |
| Store | Grocery Baskets |
| Store | Check-out Counters |
| Arena | Food kiosks |
| Airport | Gates |
| Airport | Security Line |
| Airport | Check-in Counters |
| Stadium | Waiting Areas |

According to Table 4, for example, if the user is in an arena, and the system detects food kiosks in the device's image data stream, the location of the food kiosks can be recorded as a waypoint enabling the user to navigate back to the food kiosks at a later time. If the waypoints are shared publicly, the waypoint can also assist other users to navigate to the food kiosks. In some cases, groups of people can indicate potential waypoints. For example, the location of a group of people standing in-line in an airport scene may be recorded as the location of the terminal's security line. Similarly, groups of people standing in line in a store scene can be recorded as the location of the store's check-out counters.

With a number of waypoints determined, the system can provide navigation assistance to the user to aid in finding or reaching those waypoints. The user may request navigational assistance by issuing a verbal command to the system through microphone 312. The command may be of the form "navigate to check-out counters", for example, or "navigate to the stadium". If the navigation command identifies a way point that is a relatively long distance from the user, the system can provide traditional navigational assistance to the user through output system 316. Typical navigation assistance may include providing the user with street directions—instructing the user travel particular distances along particular streets, with the turns and distances to the destination waypoint being continually provided to the user, for example. But in some cases, the user may request navigational assistance to waypoint or objects that are much closer to the user. For example, the user may ask for assistance to navigate to an object that within a few feet of the user, such as a chair, coffee cup, or a door.

Figure 15:
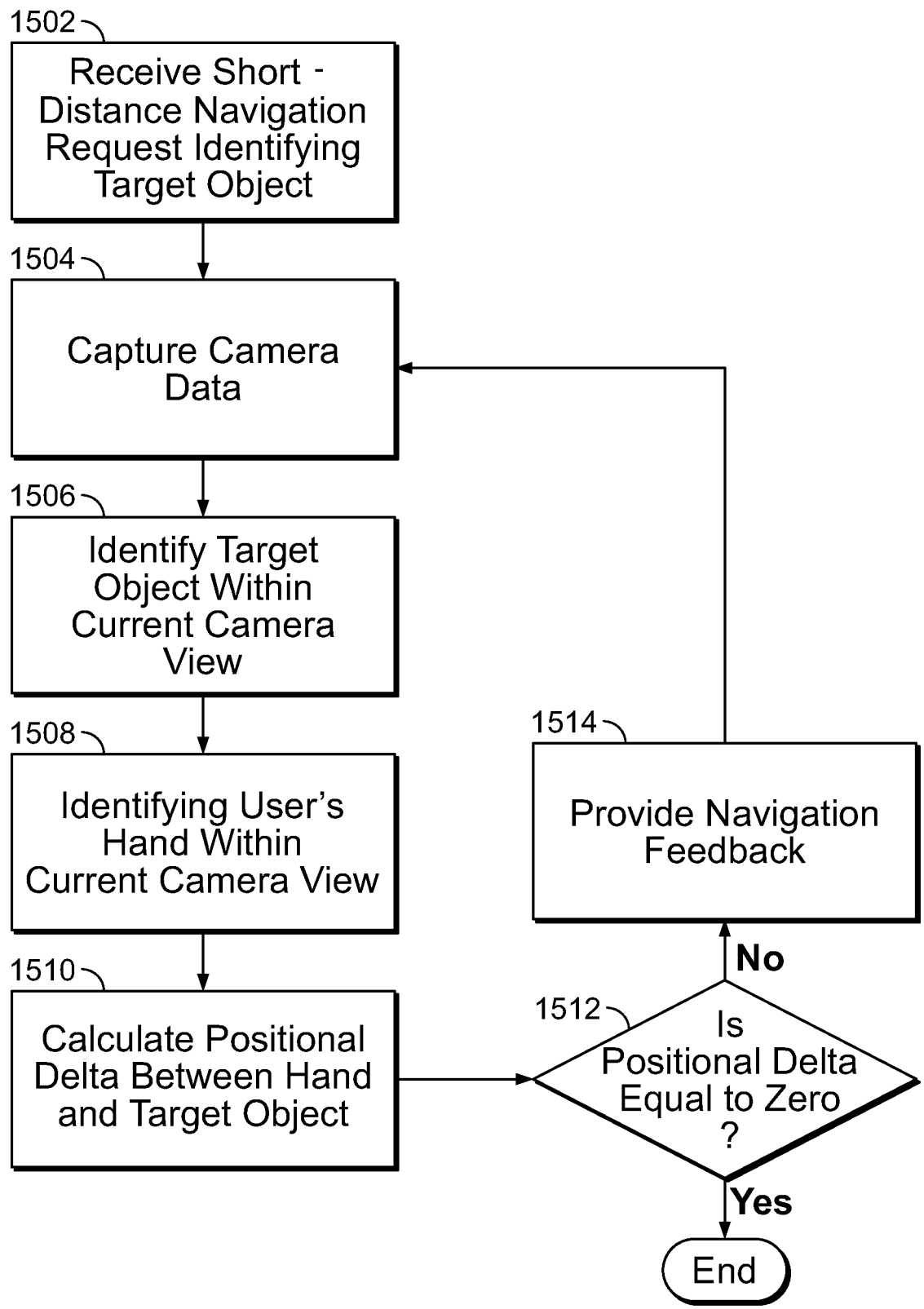
FIG. 15 is a flowchart depicting a method for short-distance navigation to assist a user in grasping or touching a desired object.

In some instances such short-distance navigation will involve navigating the user's hand to a particular object so that the user can grasp the object. FIG. 15 is a flowchart depicting a method for short-distance navigation to assist a user in grasping or touching a desired object. The method may be implemented by a controller, such as system controller 322, of the present device. In step 1502 the controller receives an instruction from the user (e.g., a verbal instruction via microphone 312) to initiate short-distance navigation to a particular object. If the requested object has been identified in the past, the controller already knows the location of the object due to the object locations determined by the device's local and remote image processing systems. If the object has not been previously identified, the controller may cause the local and remote image processing systems to analyze image data captured by the device's camera to identify the requested object and determine the object's location. Accordingly, after receiving the short-distance navigation instruction in step 1502 in step 1504 image data generated by the device's camera is monitored and in step 1506 the target object of the navigation request is identified and located within the camera's current image data stream.

Additionally, to assist in helping the user navigating the user's hand to the object, in step 1508, the image data stream generated by the device's camera is monitored to identify the user's hand within the images being captured. With both the object that was the subject of the navigation request and the user's hand identified and located, in step 1510 the controller determines a positional difference between the target object and the user's hand. The positional difference is expressed as a vector with a length equal to the distance between the user's hand and the object and a direction that extends from the user's hand to the target object. In step 1512 the controller determines whether the length of the positional difference vector is equal to zero. If so, the user is in contact with the object and the method of navigation can end.

But if the length of the positional difference vector is not equal to zero, in step 1514 the controller can provide feedback to the user (e.g., through output system 316) to assist the user in locating the target object. Based upon the positional difference vector, the feedback may state the distance between the user's hand and the object as well as the direction the user needs to reach towards the object. For example, the feedback could state that the target object is "12 inches away from your hand, just to the right." The method repeats, returning to step 1504, so that the user's movement towards the target object can be continually monitored and feedback provided until the user reaches the target object.

In an embodiment a system includes a user-wearable device including a camera and a loudspeaker. The user-wearable device is configured to generate a sequence of images of an environment. Each image in the sequence of images is associated with a geographical location at a time the image was generated. The system includes an image processing system configured to execute instructions for receiving a first image from the sequence of images, the first image including a representation of a first object, determining, using the first image, a first identity of the first object, with a first confidence score, and identifying a first feature point in the representation of the first object. The image processing system is configured to execute instructions for determining a first geographical location and a first orientation of the user-wearable device and associated with the first image, calculating a first relative vector to the first feature point, wherein a length of the first relative vector is equal to a first distance between the first geographical location and the first object, and determining a second geographical location of the first object by adjusting the first geographical location in a first direction determined by the first orientation and by the first distance. The image processing system is configured to execute instructions for receiving a second image from the sequence of images, the second image including a representation of a second object, determining, using the second image, a second identity of the second object with a second confidence score, and identifying a second feature point in the representation of the second object. The image processing system is configured to execute instructions for determining a third geographical location and a second orientation of the user-wearable device and associated with the second image, calculating a second relative vector to the second feature point, wherein a length of the second relative vector is equal to a second distance between the third geographical location and the second object, and determining a fourth geographical location of the second object by adjusting the third geographical location in a second direction determined by the second orientation by the second distance. The image processing system is configured to execute instructions for determining that the first object and the second object are the same based on (i) the first identity matching the second identity and (ii) the second geographical location being within a threshold distance of the fourth geographical location, and calculating revised confidence level data based upon an average of the first confidence score and the second confidence score. The system includes a controller configured to execute instructions for receiving the revised confidence level data from the image processing system, and causing the loudspeaker to output an audio message including information about the first object.

In another embodiment, a device includes a camera and an image processing system. The image processing system is configured to execute instructions for determining, using a first image generated by the camera, a first identity of a first object represented in the first image, wherein the first image is captured at a first time and the first object is located in a physical environment, determining, using the first image, first relative position information of the first object to the camera in the physical environment, and determining a first geographical location of the camera at the first time. The image processing system is configured to execute instructions for determining a second geographical location of the first object using the first geographical location and the first relative position information, and determining, using a second image generated by the camera, a second identity of a second object represented in the second image. The second image is captured at a second time and the second object is located in the physical environment. The image processing system is configured to execute instructions for determining, using the second image, second relative position information of the second object to the camera in the physical environment, determining a third geographical location of the camera at the second time, and determining a fourth geographical location of the second object using the third geographical location and the second relative position information. The image processing system is configured to execute instructions for determining that the first object and the second object are the same based on (i) the first identity matching the second identity and (ii) the second geographical location being within a threshold distance of the fourth geographical location. The device includes a controller configured to execute instructions for receiving the first identity from the image processing system, and generating a first output message including information about the first object.

In another embodiment, a method includes determining, using a first image generated by a camera, a first identity of a first object represented in the first image. The first image is captured at a first time and the first object is located in a physical environment. The method includes determining, using the first image, first relative position information of the first object to the camera in the physical environment, determining a first geographical location of the camera at the first time, and determining a second geographical location of the first object using the first geographical location and the first relative position information. The method includes determining, using a second image generated by the camera, a second identity of a second object represented in the second image. The second image is captured at a second time and the second object is located in the physical environment. The method includes determining, using the second image, second relative position information of the second object to the camera in the physical environment, determining a third geographical location of the camera at the second time, and determining a fourth geographical location of the second object using the third geographical location and the second relative position information. The method includes determining that the first identity matches the second identity, determining the second geographical location is within a threshold distance of the fourth geographical location, and generating a first output message including information about the first object.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising:
    a user-wearable device including a camera and a loudspeaker, the user-wearable device configured to generate a sequence of images of an environment, each image in the sequence of images being associated with a geographical location at a time the image was generated;
    an image processing system configured to execute instructions for:
        receiving a first image from the sequence of images, the first image including a representation of a first object;
        determining, using the first image, a first identity of the first object, with a first confidence score,
        identifying a first feature point in the representation of the first object,
        determining a first geographical location and a first orientation of the user-wearable device and associated with the first image,
        calculating a first relative vector to the first feature point, wherein a length of the first relative vector is equal to a first distance between the first geographical location and the first object,
        determining a second geographical location of the first object by adjusting the first geographical location in a first direction determined by the first orientation and by the first distance,
        receiving a second image from the sequence of images, the second image including a representation of a second object;
        determining, using the second image, a second identity of the second object with a second confidence score,
        identifying a second feature point in the representation of the second object,
        determining a third geographical location and a second orientation of the user-wearable device and associated with the second image,
        calculating a second relative vector to the second feature point, wherein a length of the second relative vector is equal to a second distance between the third geographical location and the second object,
        determining a fourth geographical location of the second object by adjusting the third geographical location in a second direction determined by the second orientation by the second distance,
        determining that the first object and the second object are the same object based on (i) the first identity matching the second identity and (ii) the second geographical location being within a threshold distance of the fourth geographical location,
        calculating revised confidence level data based upon an average of the first confidence score and the second confidence score; and
    a controller configured to execute instructions for:
        receiving the revised confidence level data from the image processing system, and
        causing the loudspeaker to output an audio message including information about the first object.

2. The system of claim 1, wherein the image processing system is further configured to execute instructions for determining the threshold distance, wherein if the first object is a stationary object, the threshold distance is a first distance, if the first object is a non-stationary object, the threshold distance is a second distance, and the second distance is greater than the first distance.

3. The system of claim 1, wherein the first image was generated at a first time and the second image was generated at a second time, the second time being later than the first time, and the first image is associated with a first weighting value and the second image is associated with a second weighting value, the second weighting value being greater than the first weighting value.

4. A device, comprising:
    a camera;
    an image processing system configured to execute instructions for:
        determining, using a first image generated by the camera, a first identity of a first object represented in the first image, wherein the first image is captured at a first time and the first object is located in a physical environment,
        determining, using the first image, first relative position information of the first object to the camera in the physical environment,
        determining a first geographical location of the camera at the first time,
        determining a second geographical location of the first object using the first geographical location and the first relative position information,
        determining, using a second image generated by the camera, a second identity of a second object represented in the second image, wherein the second image is captured at a second time and the second object is located in the physical environment,
        determining, using the second image, second relative position information of the second object to the camera in the physical environment,
        determining a third geographical location of the camera at the second time,
        determining a fourth geographical location of the second object using the third geographical location and the second relative position information, and
        determining that the first object and the second object are the same object based on (i) the first identity matching the second identity and (ii) the second geographical location being within a threshold distance of the fourth geographical location; and
    a controller configured to execute instructions for:
        receiving the first identity from the image processing system, and
        generating a first output message including information about the first object.

5. The system of claim 4, wherein the image processing system is further configured to execute instructions for:

determining a first orientation of the camera at the first time; and determining the second geographical location using the first orientation of the camera.

6. The system of claim 4, wherein the image processing system is further configured to execute instructions for determining the second geographical location of the first object by:

identifying a first feature point in a representation of the first object in the first image; and calculating a first relative vector to the first feature point, wherein a length of the first relative vector is equal to a first distance between the camera and the first object at the first time.

7. The system of claim 6, wherein the controller is further configured to execute instructions for:

receiving, from the image processing system, the first distance; and generating a second output message including information about the first distance.

8. The system of claim 4, wherein the controller is further configured to execute instructions for:

determining a first direction from the first geographical location to the third geographical location;

determining a second direction from the second geographical location to the fourth geographical location of the camera;

determining that the first direction intersects the second direction; and generating a third output message indicating a potential collision.

9. The system of claim 4, wherein the first identity is associated with a first confidence score and the second identity is associated with a second confidence score and wherein:

the image processing system is further configured to execute instructions for, after determining that the first geographical location is within the threshold distance of the second geographical location, calculating a revised confidence score based upon the first confidence score and the second confidence score; and the controller is further configured to execute instructions for determining that the revised confidence score exceeds a threshold confidence score before generating the first output message.

10. The system of claim 9, wherein the second time is later than the first time, and first image is associated with a first weighting value and the second image is associated with a second weighting value, the second weighting value being greater than the first weighting value.

11. The system of claim 4, wherein the first identity is associated with a first confidence score and the second identity is associated with a second confidence score and further comprising:

a cloud computing service executing a second image processing system configured to execute instructions for determining a third identity of the first object, wherein the third identity is associated with a third confidence score, and wherein the image processing system is configured to execute instructions for calculating a revised confidence score by:

determining that the first identity and the third identity are the same, and calculating the revised confidence score based upon an average of the first confidence score, the second confidence score, and the third confidence score.

12. The system of claim 4, wherein the image processing system is further configured to execute instructions for:

determining the first image depicts a first scene type, and determining the second image depicts a second scene type; and the controller is further configured to execute instructions for:

determining a waypoint type associated with a sequence of images including the first image having the first scene type and the second image having the second scene type, and storing a waypoint in a memory of the controller, wherein a location of the waypoint is determined by the first geographical location or the third geographical location and the waypoint is associated with the waypoint type.

13. A method, comprising:

determining, using a first image generated by a camera, a first identity of a first object represented in the first image, wherein the first image is captured at a first time and the first object is located in a physical environment;

determining, using the first image, first relative position information of the first object to the camera in the physical environment;

determining a first geographical location of the camera at the first time;

determining a second geographical location of the first object using the first geographical location and the first relative position information;

determining, using a second image generated by the camera, a second identity of a second object represented in the second image, wherein the second image is captured at a second time and the second object is located in the physical environment;

determining, using the second image, second relative position information of the second object to the camera in the physical environment;

determining a third geographical location of the camera at the second time;

determining a fourth geographical location of the second object using the third geographical location and the second relative position information;

determining that the first object and the second object are the same object by:

determining that the first identity matches the second identity, and determining the second geographical location is within a threshold distance of the fourth geographical location; and generating a first output message including information about the first object.

14. The method of claim 13, further comprising:

determining a first orientation of the camera at the first time; and determining the second geographical location using the first orientation of the camera.

15. The method of claim 13, further comprising:

identifying a first feature point in a representation of the first object in the first image; and calculating a first relative vector to the first feature point, wherein a length of the first relative vector is equal to a first distance between the camera and the first object at the first time.

16. The method of claim 13, further comprising:

determining the first image depicts a first scene type;

determining the second image depicts a second scene type;

determining a waypoint type associated with a sequence of images including the first image having the first scene type and the second image having the second scene type; and storing a waypoint, wherein the waypoint is associated with the waypoint type.

17. The method of claim 13, wherein the first identity is associated with a first confidence score and the second identity is associated with a second confidence score, the method further comprising:

calculating a revised confidence score based upon an average of the first confidence score and the second confidence score; and determining that the revised confidence score exceeds a threshold confidence score before generating the first output message.

18. The method of claim 13, wherein the second time is later than the first time, and first image is associated with a first weighting value and the second image is associated with a second weighting value, the second weighting value being greater than the first weighting value.

19. The method of claim 13, further comprising:

determining a first direction from the first geographical location to the third geographical location;

determining a second direction from the second geographical location to the fourth geographical location;

determining that the first direction intersects the second direction; and generating a second output message indicating a potential collision.

20. The method of claim 13, wherein the first identity is associated with a first confidence score and the second identity is associated with a second confidence score, the method further comprising:

receiving, from a cloud computing service, a third identity of the first object, wherein the third identity is associated with a third confidence score;

determining that the first identity and the third identity are the same; and calculating a revised confidence score based upon an average of the first confidence score, the second confidence score, and the third confidence score.

* * * * *